US012614791B2

(12) United States Patent
Lei et al.

(10) Patent No.: US 12,614,791 B2
(45) Date of Patent: Apr. 28, 2026

(54) BATTERY CELL, BATTERY AND ELECTRIC DEVICE

(71) Applicant: CONTEMPORARY AMPEREX TECHNOLOGY (HONG KONG) LIMITED, Hong Kong (CN)

(72) Inventors: Yuyong Lei, Ningde (CN); Zhijun Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/053,159

(22) Filed: Feb. 13, 2025

(65) Prior Publication Data

US 2025/0183423 A1    Jun. 5, 2025

Related U.S. Application Data

(63) Continuation of application No. PCT/CN2023/089821, filed on Apr. 21, 2023.

(30) Foreign Application Priority Data

Feb. 28, 2023    (WO) ................ PCT/CN2023/078796

(51) Int. Cl.
*H01M 50/124* (2021.01)
*H01M 10/0587* (2010.01)
(Continued)

(52) U.S. Cl.
CPC ... *H01M 50/1245* (2021.01); *H01M 10/0587* (2013.01); *H01M 50/103* (2021.01); *H01M 50/3425* (2021.01); *H01M 2220/20* (2013.01)

(58) Field of Classification Search
CPC ......... H01M 50/1245; H01M 50/3425; H01M 50/103; H01M 10/0587; H01M 2220/20
(Continued)

(56) References Cited

U.S. PATENT DOCUMENTS

2005/0112415 A1* 5/2005 Takeshita ............ H01M 10/443
429/185
2011/0014506 A1* 1/2011 Hermann .......... H01M 10/0431
429/53
(Continued)

FOREIGN PATENT DOCUMENTS

CN          1641903 A      7/2005
CN      203071141 U      7/2013
(Continued)

OTHER PUBLICATIONS

English Language machine translation of, "Lithium Secondary Battery and Battery Pack" by Sawada Keisuke et al. in JP2012009317 (A)—Jan. 12, 2012 (Year: 2012).*

(Continued)

*Primary Examiner* — Niki Bakhtiari
*Assistant Examiner* — Omar M Kekia
(74) *Attorney, Agent, or Firm* — Ladas & Parry LLP

(57)    ABSTRACT

A battery cell, a battery, and an electric device are described. The battery cell includes a casing and a first insulating member. The casing is provided with a pressure relief mechanism. The first insulating member wraps the outer surface of the casing, the first insulating member has a first overlapping region, and the first overlapping region does not overlap with the pressure relief mechanism. In this way, the first overlapping region of the first insulating member does not block the pressure relief mechanism, reducing the risk of the pressure relief mechanism failing to release pressure in time due to that the first overlapping region of the first insulating member blocks the pressure relief mechanism, thereby improving the timeliness of pressure relief of the pressure relief mechanism and improving the reliability of the battery cell.

3 Claims, 21 Drawing Sheets

(51) Int. Cl.
   *H01M 50/103*   (2021.01)
   *H01M 50/342*   (2021.01)
(58) Field of Classification Search
   USPC .......................................................... 429/56
   See application file for complete search history.

(56)                    References Cited

U.S. PATENT DOCUMENTS

| | | | |
|---|---|---|---|
| 2014/0212717 A1 | 7/2014 | Ariga et al. | |
| 2017/0250388 A1 | 8/2017 | Unno et al. | |
| 2021/0194043 A1 | 6/2021 | Kifune | |
| 2022/0109212 A1* | 4/2022 | Bai ................... | H01M 50/3425 |
| 2022/0123406 A1 | 4/2022 | Yu et al. | |
| 2022/0336913 A1 | 10/2022 | Gu et al. | |

FOREIGN PATENT DOCUMENTS

| | | | | |
|---|---|---|---|---|
| CN | 211045480 U | 7/2020 | | |
| CN | 211980650 U | 11/2020 | | |
| CN | 213520128 U | 6/2021 | | |
| CN | 113097659 A | 7/2021 | | |
| CN | 216213918 U | 4/2022 | | |
| CN | 217035922 U | 7/2022 | | |
| CN | 218123636 U | 12/2022 | | |
| CN | 218351658 U | 1/2023 | | |
| CN | 218414822 U | 1/2023 | | |
| EP | 3690975 A1 | 8/2020 | | |
| EP | 3993144 A2 | 5/2022 | | |
| JP | 2007087922 A | 4/2007 | | |
| JP | 2012009317 * | 1/2012 | ............ | Y02E 60/10 |
| JP | 2018028964 A | 2/2018 | | |

OTHER PUBLICATIONS

International Search Report dated Jun. 23, 2023 for application PCT/CN2023/078796.

Written Opinion dated Jun. 23, 2023 for application PCT/CN2023/078796.

Notice of Grant dated Jul. 6, 2023 for application CN 202320345615.2.

International Search Report dated Nov. 15, 2023 for application PCT/CN2023/089821.

Written Opinion dated Nov. 15, 2023 for application PCT/CN2023/089821.

Notice of Grant dated Jan. 17, 2024 for application CN 202390000064.4.

Extended European Search Report for EP application No. 23924595.4, dated Oct. 29, 2025.

Extended European Search Report for EP application No. 23924781.0, dated Nov. 12, 2025.

* cited by examiner

1000

100

BATTERY CELL, BATTERY AND ELECTRIC DEVICE

CROSS-REFERENCE TO RELATED APPLICATIONS

The present application is a continuation of International application PCT/2023/089821 filed on Apr. 21, 2023 that claims priority from International application PCT/CN2023/078796 filed on Feb. 28, 2023. The contents of these applications are incorporated herein in their entirety by reference.

TECHNICAL FIELD

The present application relates to the field of battery technology, and specifically, to a battery cell, a battery, and an electric device.

BACKGROUND ART

Batteries are widely used in electronic devices, such as mobile phones, laptop computers, battery cars, electric cars, electric airplanes, electric ships, electric toy cars, electric toy ships, electric toy airplanes and electric tools.

In battery technology, a pressure relief mechanism may be provided in a battery cell, and pressure may be released through the pressure relief mechanism when the battery cell experiences thermal runaway. For general battery cells, there is still a situation that the pressure is not released in time, resulting in poor reliability of the battery cells. Therefore, how to improve the reliability of battery cells is an urgent technical problem that needs to be solved in battery technology.

SUMMARY

Embodiments of the present application provides a battery cell, a battery, and an electric device, which can effectively improve the reliability of the battery cell.

In a first aspect, embodiments of the present application provide a battery cell, including a casing and a first insulating member; the casing is provided with a pressure relief mechanism; the first insulating member wraps the outer surface of the casing, the first insulating member has a first overlapping region, and the first overlapping region does not overlap with the pressure relief mechanism.

In the above technical solution, the first overlapping region of the first insulating member does not overlap with the pressure relief mechanism, such that the first overlapping region of the first insulating member does not block the pressure relief mechanism, reducing the risk of the pressure relief mechanism failing to release pressure in time due to that the first overlapping region of the first insulating member blocks the pressure relief mechanism, improving the timeliness of pressure relief of the pressure relief mechanism and improving the reliability of the battery cell.

In some embodiments, the casing includes a first wall part and a second wall part, the pressure relief mechanism is provided on the first wall part, and the first overlapping region is provided on an outer surface of the second wall part. In this way, the pressure relief mechanism and the first overlapping region are respectively located on the two wall parts, further reducing the influence of the first overlapping region on the pressure relief mechanism.

In some embodiments, the first insulating member covers the outer surface of the first wall part and the outer surface of the second wall part, realizing insulation of the first wall part and the second wall part from external components, improving the insulation performance of the battery cell, and reducing the risk of short circuit of the battery cell.

In some embodiments, the casing further includes a third wall part and a fourth wall part, the third wall part and the fourth wall part are provided opposite to each other in the thickness direction of the battery cell, and the first wall part and the second wall part are both connected to the third wall part and the fourth wall part. The third wall part and the fourth wall part are two wall parts of the casing that are provided opposite to each other in the thickness direction of the battery cell. When the electrode assembly inside the casing expands, the electrode assembly has a larger expansion amount in the thickness direction of the battery cell, and the deformation amounts of the third wall part and the fourth wall part are greater than those of the first wall part and the second wall part. Since the pressure relief mechanism is provided on the first wall part, the influence of the expansion of the electrode assembly on the pressure relief mechanism may be reduced, thereby increasing the service life of the pressure relief mechanism. Since the first overlapping region of the first insulating member is disposed on the outer surface of the second wall part, the first overlapping region is not located in the thickness direction of the battery cell, and the first overlapping region does not occupy the expansion space of the battery cell expanding in the thickness direction, providing more expansion space for the battery cell and prolonging the service life of the battery cell.

In some embodiments, the first wall part and the second wall part are provided opposite to each other, and the first wall part, the third wall part, the second wall part, and the fourth wall part are connected end to end in sequence. In this way, the pressure relief mechanism and the first overlapping region are respectively located on the two opposite wall parts of the casing, such that the pressure relief mechanism and the first overlapping region are farther apart from each other, further reducing the influence of the first overlapping region on the pressure relief mechanism.

In some embodiments, openings are formed at two opposite ends of the casing, and the first wall part, the third wall part, the second wall part and the fourth wall part are sequentially provided in the circumferential directions of the openings. The first wall part, the third wall part, the second wall part and the fourth wall part form a casing with openings at two opposite ends thereof. The casing of this structure is simple in structure. When assembling a battery cell, the electrode assembly can enter the casing from any opening of the casing, which can improve the efficiency of the electrode assembly entering the casing.

In some embodiments, the first insulating member covers the outer surface of the first wall part, the outer surface of the second wall part, the outer surface of the third wall part and the outer surface of the fourth wall part, realizing insulation of the first wall part, the second wall part, the third wall part, and the fourth wall part from external components, improving the insulation performance of the battery cell, and reducing the risk of short circuit of the battery cell.

In some embodiments, the casing further includes a fifth wall part, where the first wall part, the third wall part, the second wall part and the fourth wall part are provided surrounding the fifth wall part, and the casing is provided with an opening at one end thereof opposite to the fifth wall part. The casing of this structure is provided with only one opening, and the fifth wall part is connected with the first wall part, the second wall part, the third wall part and the fourth wall part, so that the casing has better structural stability and is not easy to deform. When assembling the battery cell, after the electrode assembly is installed in the casing through the opening, only one opening of the casing needs to be sealed, which can effectively improve the assembly efficiency of the battery cell.

In some embodiments, the casing further includes a fifth wall part, where the second wall part and the fifth wall part are provided opposite to each other, the second wall part, the third wall part, the fifth wall part and the fourth wall part are connected end to end in sequence and provided surrounding the first wall part, and the casing is provided with an opening at one end thereof opposite to the first wall part. The pressure relief mechanism is provided on the first wall part, that is, the pressure relief mechanism is provided on the wall part of the casing opposite to the opening, such that when the battery cell has thermal runaway, the discharge medium generated by the electrode assembly may quickly reach the pressure relief mechanism to achieve rapid pressure relief.

In some embodiments, the first insulating member covers the outer surface of the first wall part, the outer surface of the second wall part, the outer surface of the third wall part, the outer surface of the fourth wall part, and the outer surface of the fifth wall part, realizing insulation of the first wall part, the second wall part, the third wall part, the fourth wall part and the fifth wall part from external components, improving the insulation performance of the battery cell, and reducing the risk of short circuit of the battery cell.

In some embodiments, the battery cell further includes an electrode assembly, where at least a part of the electrode assembly is accommodated in the casing, and the electrode assembly includes a positive electrode sheet and a negative electrode sheet; the electrode assembly is in a laminated/stacked structure, and the positive electrode sheet and the negative electrode sheet are stacked in the thickness direction of the battery cell; or, the electrode assembly is in a wound structure, and the electrode assembly has a straight region, and the parts of the positive electrode sheet and the negative electrode sheet located in the straight region are stacked in the thickness direction of the battery cell. If the electrode assembly is in the laminated structure, the bending of the electrode sheets is reduced, which may effectively reduce lithium precipitation of the electrode assembly. Since the stacking direction of the positive electrode sheet and the negative electrode sheet is consistent with the thickness direction of the battery cell, the electrode assembly has larger expansion amount in the thickness direction of the battery cell when expanding, and the first wall part is less affected when the electrode assembly expands, reducing the influence of the expansion of the electrode assembly on the pressure relief mechanism. If the electrode assembly is in a wound structure, the forming efficiency of the electrode assembly is higher. Since the stacking direction of parts of the positive electrode sheet and the negative electrode sheet located in the straight region is consistent with the thickness direction of the battery cell, the electrode assembly has larger expansion amount in the thickness direction of the battery cell when expanding, and the first wall part is less affected when the electrode assembly expands, reducing the influence of the expansion of the electrode assembly on the pressure relief mechanism.

In some embodiments, the first wall part and/or the second wall part are parallel to the thickness direction of the battery cell. When the electrode assembly inside the casing expands, the electrode assembly has larger expansion amount in the thickness direction of the battery cell. If the first wall part is parallel to the thickness direction of the battery cell, since the pressure relief mechanism is provided on the first wall part, the influence of the expansion of the electrode assembly on the pressure relief mechanism may be reduced, thereby increasing the service life of the pressure relief mechanism. If the second wall part is parallel to the thickness direction of the battery cell, since the first overlapping region of the first insulating member is disposed on the outer surface of the second wall part, the first overlapping region is not located in the thickness direction of the battery cell, and the first overlapping region does not occupy the expansion space of the battery cell expanding in the thickness direction, thereby providing more expansion space for the battery cell and prolonging the service life of the battery cell.

In some embodiments, the casing includes a first wall part, and the pressure relief mechanism is provided on the first wall part; the first insulating member includes a first insulating part covering the outer surface of the first wall part, and a first pressure relief region is formed in the region of the first insulating part corresponding to the pressure relief mechanism, and the first pressure relief region is formed in the region of the first insulating part corresponding to the pressure relief mechanism, and the first pressure relief region is configured to allow the discharge medium discharged by the pressure relief mechanism to move from a side of the first insulating part facing the pressure relief mechanism to a side of the first insulating part facing away from the pressure relief mechanism. The configuration of the first pressure relief region can reduce the influence of the first insulating part on the pressure relief mechanism, so that the pressure relief mechanism can timely release pressure when the battery cell has thermal runaway. The discharge medium inside the battery cell can be quickly discharged through the pressure relief mechanism and the first pressure relief region in turn, which improves the timeliness of pressure relief of the battery cell.

In some embodiments, the first pressure relief region includes a first through hole provided in the first insulating part. The first pressure relief region has a simple structure and is easy to form. When the battery cell experiences thermal runaway, the first insulating part has less hindering effect on the pressure relief mechanism, and the discharge medium inside the battery cell may be discharged more quickly through the pressure relief mechanism.

In some embodiments, the first insulating part is provided with a first weak portion, and the first weak portion defines the first pressure relief region. In this way, the first insulating part may cover the pressure relief mechanism, thereby improving the insulation performance of the battery cell. The first insulating part has lower strength at the position of the first weak portion. When the battery cell has thermal runaway, the first insulating part may be cracked at the position of the first weak portion to open the first pressure relief region, so that the discharge medium inside the battery cell may be quickly discharged.

In some embodiments, the first weak portion includes a first linear groove and/or a first broken line provided in the first insulating part. By providing the first linear groove and/or the first broken line on the first insulating part, the first insulating part is locally weakened, and the implementation method is simple.

In some embodiments, the casing has an opening, the first insulating member wraps the outer surface of the casing in the circumferential direction of the opening, and in the circumferential direction of the opening, the parts of the two ends of the first insulating member overlapping each other form a first overlapping region. The first insulating member wraps the outer surface of the casing in the circumferential direction of the opening, so as to quickly cover more regions of the outer surface of the casing, and thereby improve the insulation performance of the battery cell. The first insulating member wraps the outer surface of the casing in the circumferential direction of the opening, and the two ends of the first insulating member overlap each other, so as to realize that the first insulating member covers the outer surface of the casing and the implementation method is simple.

In some embodiments, the casing has a weld mark region, and the first overlapping region covers at least a part of the weld mark region. Since the first overlapping region is a thicker region of the first insulating member, the first overlapping region covers at least a part of the weld mark region, reducing the risk of the weld mark region piercing the first insulating member and causing insulation failure of the battery cell, and improving the insulation performance of the battery cell.

In some embodiments, the first overlapping region covers all of the weld mark region, increasing the overlapping region between the first overlapping region and the weld mark region, and further reducing the risk of the weld mark region piercing the first insulating member.

In some embodiments, the casing is formed by bending a plate, and two ends of the plate are connected by welding to form the weld mark region. When forming the casing, it needs only to bend the plate and weld the two ends of the plate. The casing has simple forming method and is easier to form than traditional casings formed by stamping or stretching. It can effectively reduce the forming difficulty and the forming efficiency of the casing, and the yield rate of finished products are higher.

In some embodiments, the casing includes a first wall part, and the pressure relief mechanism is arranged on the first wall part; the pressure relief mechanism and the first wall part are integrally formed; or, the pressure relief mechanism and the first wall part are separately arranged, and the pressure relief mechanism is installed on the first wall part. If the pressure relief mechanism is integrally formed with the first wall part, the reliability of the pressure relief mechanism is higher, the process of connecting the pressure relief mechanism and the first wall part is omitted, and the production cost of the battery cell can be reduced. If the pressure relief mechanism and the first wall part are separately provided, the pressure relief mechanism is a component independent of the casing, and the pressure relief mechanism and the casing may be produced and assembled separately, with low production difficulty and high efficiency.

In some embodiments, the battery cell further includes an electrode assembly and a second insulating member; the electrode assembly is at least partially disposed in the casing; the second insulating member is disposed between the electrode assembly and the casing, and the second insulating member is configured to insulate and isolate the electrode assembly and the casing, where the second insulating member has a second overlapping region, and the second overlapping region does not overlap with the pressure relief mechanism. The second insulating member is located between the electrode assembly and the casing, and serves to separate the electrode assembly from the casing to achieve insulation between the electrode assembly and the casing. The second overlapping region does not overlap with the pressure relief mechanism, so that the second overlapping region of the second insulating member does not block the pressure relief mechanism, reducing the impact of the second overlapping region on the pressure relief mechanism and improving the timeliness of pressure relief of the pressure relief mechanism.

In some embodiments, the casing includes a first wall part and a second wall part, the pressure relief mechanism is provided on the first wall part, and the second overlapping region is provided on an inner side of the second wall part, and located between the second wall part and the electrode assembly. In this way, the pressure relief mechanism and the second overlapping region are provided respectively corresponding to the two wall parts of the casing, further reducing the influence of the second overlapping region on the pressure relief mechanism.

In some embodiments, the casing has an opening, the second insulating member wraps the outer surface of the electrode assembly in the circumferential direction of the opening, and in the circumferential direction of the opening, the parts of the two ends of the second insulating member overlapping each other form a second overlapping region. The second insulating member wraps the outer surface of the electrode assembly in the circumferential direction of the opening, so as to quickly cover more regions of the outer surface of the electrode assembly, and thereby improve the insulation performance between the electrode assembly and the casing. The second insulating member wraps the outer surface of the electrode assembly in the circumferential direction of the opening, and the two ends of the second insulating member overlap each other, so as to realize that the second insulating member covers the outer surface of the electrode assembly and the implementation method is simple.

In some embodiments, the casing includes a first wall part, and the pressure relief mechanism is provided on the first wall part; the second insulating member includes a second insulating part located between the first wall part and the electrode assembly, and a second pressure relief region is formed in the region of the second insulating part corresponding to the pressure relief mechanism, and the second pressure relief region is configured to allow the discharge medium inside the battery cell to move from one side of the second insulating part away from the pressure relief mechanism to one side of the second insulating part facing the pressure relief mechanism. The arrangement of the second pressure relief region may reduce the hindering effect of the second insulating part on the discharge medium, so that the discharge medium generated by the electrode assembly can quickly reach the pressure relief mechanism through the second pressure relief region, shortening the path of the discharge medium generated by the electrode assembly moving to the pressure relief mechanism, and improving the timeliness of the pressure relief of the battery cell.

In some embodiments, the second pressure relief region includes a second through hole provided in the second insulating part. The second pressure relief region has a simple structure and is easy to form. When the battery cell experiences thermal runaway, the discharge medium generated by the electrode assembly may more quickly pass through the second through hole and reach the pressure relief mechanism.

In some embodiments, the second insulating part is provided with a second weak portion, and the second weak portion defines the second pressure relief region. During normal use of the battery cell, the second pressure relief region is not opened, and the second insulating member may play a better insulating role between the electrode assembly and the casing. The second insulating part has lower strength at the position of the second weak portion. When the battery cell has thermal runaway, the second insulating part may be cracked at the position of the second weak portion to open the second pressure relief region, so that the discharge medium generated by the electrode assembly may quickly pass through the second insulating part and reach the pressure relief mechanism.

In some embodiments, the second weak portion includes a second linear groove and/or a second broken line provided in the second insulating part. By providing the second linear groove and/or the second broken line on the second insulating part, the second insulating part is locally weakened, and the implementation method is simple.

In a second aspect, embodiments of the present application provide a battery, including at least one battery cell provided by any of the embodiments of the first aspect.

In a third aspect, embodiments of the present application provide an electric device, including at least one battery cell provided by any of the embodiments of the first aspect.

BRIEF DESCRIPTION OF DRAWINGS

In order to illustrate the technical solutions of the embodiments of the present application more clearly, the drawings required to be used in the embodiments will be briefly introduced below. It should be understood that the drawings below only show some embodiments of the present application and thus should not be construed as limiting the scope. Those of ordinary skill in the art may also obtain other relevant drawings based on the drawings without paying creative efforts.

Figure 1:
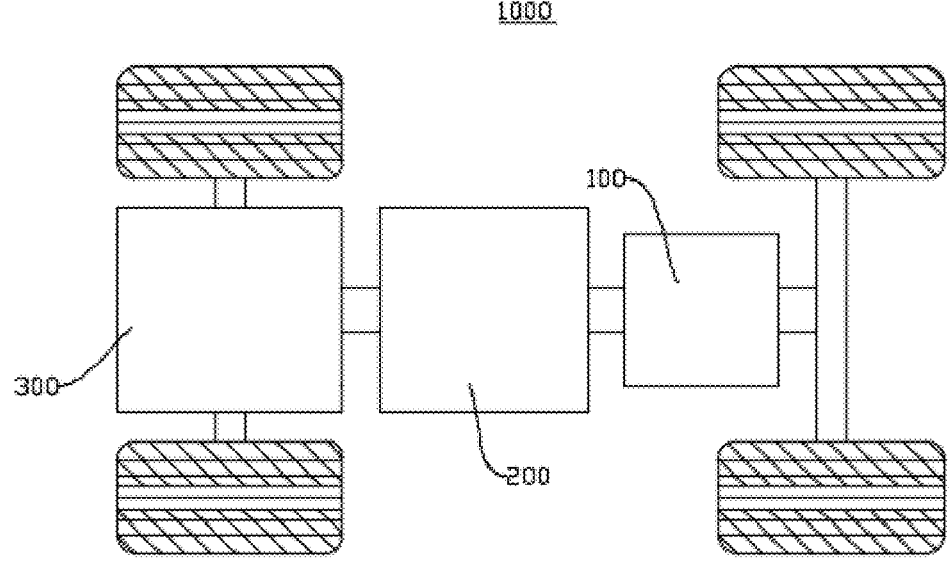
FIG. 1 is a schematic structural diagram of a vehicle provided by some embodiments of the present application.

Reference signs: 1—shell; 11—casing; 111—first wall part; 1111—groove; 1112—pressure relief hole; 112—second wall part; 1121—first end; 1122—second end; 113—third wall part; 114—fourth wall part; 115—fifth wall part; 116—opening; 117—weld mark region; 12—end cover; 2—electrode assembly; 21—tab; 22—positive electrode sheet; 23—negative electrode sheet; 24—separation member; 25—straight region; 26—bending region; 3—pressure relief mechanism; 31—score groove; 4—first insulating member; 41—first overlapping region; 42—first insulating part; 421—first pressure relief region; 4211—first through hole; 4212—first weak portion; 42121—first linear groove; 42122—first broken line; 5—second insulating member; 51—second overlapping region; 52—second insulating part; 521—second pressure relief region; 5211—second through hole; 5212—second weak portion; 52121—second linear groove; 52122—second broken line; 6—electrode terminal; 10—battery cell; 20—box; 201—first part; 202—second part; 100—battery; 200—controller; 300—motor; 1000—vehicle; X—first direction; Y—second direction; Z—third direction.

DETAILED DESCRIPTION OF EMBODIMENTS

In order to make the purposes, technical solutions and advantages of the embodiments of the present application clearer, the technical solutions in the embodiments of the present application will be clearly described below in conjunction with the drawings in the embodiments of the present application. Obviously, the described embodiments are some, not all of the embodiments of the present application. Based on the embodiments in the present application, all other embodiments obtained by those of ordinary skill in the art without paying creative efforts fall within the scope of protection of the present application.

Unless otherwise defined, all technical and scientific terms used in the present application have the same meanings as commonly understood by those skilled in the art of the present application; the terms used in the description of the present application are for the purpose of describing specific examples only and are not intended to limit the present application; the terms "including" and "having" and any variations thereof in the description and claims of the present application and the above description of the drawings are intended to cover non-exclusive inclusion. The terms "first", "second", etc. in the description and claims of the present application or the above-mentioned drawings are used to distinguish different objects, rather than to describe a specific order or priority relationship.

Reference made herein to "embodiment/example" means that a particular feature, structure, or characteristic described in connection with the embodiment may be included in at least one embodiment/example of the present application. The phases occurring in various places in the specification do not necessarily all refer to the same embodiment, nor are separate or alternative embodiments mutually exclusive of other embodiments.

In the description of the present application, it should be indicated that unless otherwise clearly specified and limited, technical terms such as "install", "link", "connect" and "attach" should be understood in a broad sense, for example, it may be a fixed connection, or a detachable connection, or an integral connection; it may be a direct connection, or an indirect connection through an intermediary, or it may be an internal communication between two elements. Those of ordinary skill in the art may understand the specific meanings of the above terms in the present application according to specific situations.

The term "and/or" in the present application indicates only an association relationship describing associated objects, meaning that there may be three kinds of relationships. For example, A and/or B may indicate three situations: there is only A, there are both A and B, and there is only B. In addition, the character "/" in the present application generally indicates that the associated objects therebefore and thereafter have an "or" relationship.

In the embodiments of the present application, the same reference signs represent the same components, and for the sake of simplicity, detailed descriptions of the same components in different embodiments are omitted. It should be understood that the thickness, length, width and other dimensions of various components, as well as the overall thickness, length, width and other dimensions of the integrated device, in the embodiments of the present application shown in the drawings are only illustrative and should not constitute any limitation to the present application.

"Multiple/plurality of" appearing in the present application means two or more (including two).

In the embodiment of the present application, the battery cell may be a secondary battery. A secondary battery refers to a battery cell that can be continuously used by charging to activate active materials, after the battery cell is discharged.

The battery cell may include, but not limited to, lithium ion battery, sodium ion battery, sodium-lithium ion battery, lithium metal battery, sodium metal battery, lithium-sulfur battery, magnesium ion battery, nickel-hydrogen battery, nickel-cadmium battery, lead storage battery, etc.

The battery cell generally includes at least one electrode assembly. The electrode assembly includes a positive electrode, a negative electrode and a separation member. During charging and discharging of a battery cell, active ions (such as lithium ions) are inserted and deinserted back and forth between the positive and negative electrodes. The separation member is disposed between the positive electrode and the negative electrode, which can prevent the positive and negative electrodes from short-circuiting and simultaneously allow the active ions to pass therethrough.

In some embodiments, the positive electrode may be a positive electrode sheet which may include a positive current collector and a positive electrode active material disposed on at least one surface of the positive current collector.

As an example, the positive current collector has two surfaces opposite to each other in its thickness direction, and the positive electrode active material is disposed on either or both of the two surfaces of the positive current collector opposite to each other.

As an example, the positive current collector may be a metal foil or a composite current collector. For example, as the metal foil, surface-treated aluminum or stainless steel with silver, stainless steel, copper, aluminum, nickel, carbon electrode, carbon, nickel or titanium or the like may be used. The composite current collector may include a polymer material base layer and a metal layer. The composite current collector may be formed by forming a metal material (aluminum, aluminum alloy, nickel, nickel alloy, titanium, titanium alloy, silver and silver alloy, etc.) on a polymer material substrate (such as a substrate of polypropylene, polyethylene terephthalate, polybutylene terephthalate, polystyrene, polyethylene, etc.).

As an example, the positive electrode active material may include at least one of the following materials: lithium-containing phosphate, lithium transition metal oxide, and their respective modified compounds. However, the present application is not limited to these materials, and other traditional materials that can be used as positive electrode active materials for batteries may also be used. Only one of these positive electrode active materials may be used. Or a combination of two or more of them may be used. In the above, examples of lithium-containing phosphate may include, but are not limited to, at least one of lithium iron phosphate (such as LiFePO4 (also referred to as LFP)), composite material of lithium iron phosphate and carbon, lithium manganese phosphate (such as LiMnPO4), composite material of lithium manganese phosphate and carbon, lithium iron manganese phosphate, and composite material of lithium iron manganese phosphate and carbon. Examples of lithium transition metal oxides may include, but not limited to, at least one of lithium cobalt oxide (such as $LiCoO_2$), lithium nickel oxide (such as $LiNiO_2$), lithium manganese oxide (such as $LiMnO_2$, $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$), lithium nickel cobalt aluminum oxide (such as $LiNi_{0.85}Co_{0.15}Al_{0.05}O_2$) and modified compounds of them.

In some embodiments, the positive electrode may be made of foam metal. The foam metal may be nickel foam, copper foam, aluminum foam, alloy foam, or carbon foam, etc. When the foam metal is used as the positive electrode, the surface of the foam metal may be not provided with a positive electrode active material, but certainly may also be provided with the positive electrode active material. As an example, a lithium source material, potassium metal or sodium metal may be filled or/and deposited in the foam metal, and the lithium source material is lithium metal and/or a lithium-rich material.

In some embodiments, the negative electrode may be a negative electrode sheet which may include a negative current collector.

As an example, the negative current collector may be a metal foil, a foam metal, or a composite current collector. For example, as the metal foil, surface-treated aluminum or stainless steel with silver, stainless steel, copper, aluminum, nickel, carbon electrode, carbon, nickel or titanium or the like may be used. The foam metal may be nickel foam, copper foam, aluminum foam, alloy foam, or carbon foam, etc. The composite current collector may include a polymer material base layer and a metal layer. The composite current collector may be formed by forming a metal material (copper, copper alloy, nickel, nickel alloy, titanium, titanium alloy, silver and silver alloy, etc.) on a polymer material substrate (such as a substrate of polypropylene, polyethylene terephthalate, polybutylene terephthalate, polystyrene, polyethylene, etc.).

As an example, the negative electrode sheet may include a negative current collector and a negative electrode active material disposed on at least one surface of the positive current collector.

As an example, the negative current collector has two surfaces opposite to each other in its thickness direction, and the negative electrode active material is disposed on either or both of the two surfaces of the negative current collector opposite to each other.

As an example, the negative electrode active material may be a negative electrode active material for a battery cell well known in the art. As an example, the negative electrode active material may include at least one of the following materials: artificial graphite, natural graphite, soft carbon, hard carbon, silicon-based material, tin-based material, lithium titanate, etc. The silicon-based material may be selected from at least one of elemental silicon, silicon-oxygen compound, silicon-carbon composite, silicon-nitrogen composite and silicon alloy. The tin-based material may be selected from at least one of elemental tin tin-oxygen compound, and tin alloy. However, the present application is not limited to these materials, and other traditional materials that can be used as negative electrode active materials for batteries may also be used. Only one of these negative electrode active materials may be used. Or a combination of two or more of them may be used.

In some embodiments, the material of the positive current collector may be aluminum, and the material of the negative current collector may be copper.

In some embodiments, the separation member is a separator. Any well-known porous separator with good chemical stability and mechanical stability may be selected as the separator.

As an example, the main material of the separator may include at least one of glass fiber, non-woven fabric, polyethylene, polypropylene, and polyvinylidene fluoride. The separator may be a single-layer film or a multi-layer composite film. When the separator is the multi-layer composite film, materials of the layers may be same or different. The separation member may be a separate component located between the positive and negative electrodes, or may be attached to the surfaces of the positive and negative electrodes.

In some embodiments, the separation member is solid electrolyte. The solid electrolyte is arranged between the positive electrode and the negative electrode, and plays the role of transporting ions and isolating the positive electrode from negative electrode.

In some embodiments, the battery cell further includes an electrolyte, which plays a role in conducting ions between the positive electrode and negative electrode. The electrolyte may be liquid, gelatinous or solid. In the above, the liquid electrolyte includes an electrolyte salt and a solvent.

In some embodiments, the electrolyte salt may include at least one of lithium hexafluorophosphate, lithium tetrafluoroborate, lithium perchlorate, lithium hexafluoroarsenate, lithium bisfluorosulfonyl imide, lithium bis(trifluoromethanesulfonyl)imide, lithium trifluoromethanesulfonate, lithium difluorophosphate, lithium difluorooxalatoborate, lithium dioxalatoborate, lithium difluorodioxalatophosphate, and lithium tetrafluorooxalatophosphate.

In some embodiments, the solvent may include at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and diethyl sulfone. An ether solvent may also be selected as the solvent. The ether solvent may include one or more of ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyltetrahydrofuran, diphenyl ether and crown ether.

In the above, the gelatinous electrolyte includes a skeleton network using the polymer as the electrolyte, with an ionic liquid-lithium salt.

In the above, the solid electrolyte includes polymer solid electrolyte, inorganic solid electrolyte, and composite solid electrolyte.

As an example, the polymer solid electrolyte may be polyether (polyethylene oxide), polysiloxane, polycarbonate, polyacrylonitrile, polyvinylidene fluoride, polymethyl methacrylate, single ion polymer, polyionic liquid-lithium salt, cellulose, and the like.

As an example, the inorganic solid electrolyte may include one or more of oxide solid electrolyte (crystalline perovskite, sodium superconducting ion conductor, garnet, amorphous LiPON film), sulfide solid electrolyte (crystalline lithium superion conductor (lithium germanium phosphosulfide, argyrodite), amorphous sulfide), halide solid electrolyte, nitride solid electrolyte and hydride solid electrolyte.

As an example, the composite solid electrolyte is formed by adding an inorganic solid electrolyte filler to a polymer solid electrolyte.

In some embodiments, the electrode assembly is in a wound structure. The positive electrode sheet and the negative electrode sheet are wound into the wound structure.

In some embodiments, the electrode assembly is in a laminated structure.

As an example, a plurality of positive electrode sheets and a plurality of negative electrode sheets may be provided respectively, and the plurality of positive electrode sheets and the plurality of negative electrode sheets may be alternately stacked.

As an example, a plurality of positive electrode sheets may be provided, and the negative electrode sheet may be folded to form a plurality of stacked folded segments, with each adjacent folded segments having a positive electrode sheet sandwiched therebetween.

As an example, the positive electrode sheet and the negative electrode sheet are each folded to form a plurality of stacked folded segments.

As an example, a plurality of separation members may be provided, each of which is provided between any adjacent positive electrode sheets or negative electrode sheets.

As an example, the separation members may be provided continuously, each of which is provided between any adjacent positive electrode sheets or negative electrode sheets in a folding or winding way.

In some embodiments, the shape of the electrode assembly may be cylindrical, flat, or polygonal, etc.

In some embodiments, the electrode assembly is provided with tabs which can conduct current out from the electrode assembly. The tabs include a positive tab and a negative tab.

In some embodiments, the battery cell may include a shell. The shell is used to package components such as the electrode assembly and the electrolyte. The shell may be a steel shell, an aluminum shell, a plastic shell (such as polypropylene), a composite metal shell (such as a copper-aluminum composite shell) or an aluminum-plastic film, etc.

As an example, the battery cell may be a cylindrical battery cell, a prismatic battery cell, a soft-pack battery cell or a battery cell of other shapes, the prismatic battery cell includes a square-shell battery cell, a blade-shaped battery cell, a multi-prismatic battery, and the multi-prismatic battery is, for example, a hexagonal battery, etc., which are not specifically limited in the present application.

The battery mentioned in embodiments of the present application refers to a single physical module that includes one or more battery cells to provide higher voltage and capacity.

In some embodiments, the battery may be a battery module. When there are multiple battery cells, the multiple battery cells are arranged and fixed to form a battery module.

In some embodiment, the battery may be a battery pack. The battery pack includes a box and battery cell(s), and the battery cell(s) or the battery module is accommodated in the box.

In some embodiments, the box may be provided as a portion of the chassis structure of the vehicle. For example, a portion of the box may become at least a portion of the floor of the vehicle, or a portion of the box may become at least a portion of the cross beams and the longitudinal beams of the vehicle.

In some embodiments, the battery cell may be an energy storage device. The energy storage device includes an energy storage container, an energy storage cabinet, etc.

For the development of battery technology, many design factors need to be considered at the same time, for example, performance parameters such as energy density, cycle life, discharge capacity, and charge-discharge rate. In addition, the reliability of the battery cell also needs to be considered.

In battery technology, a pressure relief mechanism may be provided in a battery cell to improve the reliability of the battery cell. The pressure relief mechanism on the battery cell has an important impact on the reliability of the battery. For example, when short circuit, overcharging or other phenomenon occurs, thermal runaway may occur inside the battery cell, causing a sudden increase in pressure or temperature. In this case, the internal pressure and temperature may be released outwards through the pressure relief mechanism to reduce the probability of occurrence of explosion and fire of the battery cells.

In the battery cell, an insulating member may be provided on the outer side of the casing to achieve insulation of the battery cell and reduce the risk of short circuit of the battery cell. Generally, after the insulating member is coated on the outer surface of the casing, an overlapping region is formed by the insulating member, and the overlapping region covers the pressure relief mechanism on the casing. Since the thickness of the overlapping region is thicker than that of other regions of the insulating member, the overlapping region is not easily damaged when the battery cell experiences thermal runaway. The overlapping region has a greater impact on the pressure relief mechanism, resulting in the pressure relief mechanism being unable to release pressure in time and the reliability of the battery cell being reduced.

In view of this, embodiments of the present application provide a battery cell, in which the first overlapping region of the first insulating member coated on the outer surface of the casing is provided not overlapping with the pressure relief mechanism on the casing, to reduce the influence of the first overlapping region on the pressure relief mechanism, improve the timeliness of pressure relief of the pressure relief mechanism and improve the reliability of the battery cell.

The battery cell described in the embodiments of the present application is applicable to the battery and the electric device using the battery cell.

The electric device may be vehicle, mobile phone, portable device, laptop, ship, spacecraft, electric toy and electric tool, etc. The vehicle may be fuel vehicle, gas vehicle or new energy vehicle. The new energy vehicle may be pure electric vehicle, hybrid power vehicle or extended range vehicle, etc. The spacecraft includes airplane, rocket, space shuttle and space ship, etc. The electric toy includes a fixed or mobile electric toy, for example, game console, electric car toy, electric ship toy and electric airplane toy, etc. The electric tool includes metal cutting electric tool, grinding electric tool, assembly electric tool and railway electric tool, for example, electric drill, electric grinder, electric wrench, electric screwdriver, electric hammer, impact electric drill, concrete vibrator and electric planer, etc. The embodiments of the present application do not specifically limit the above electric device.

For convenient description, the following embodiments are described by taking a vehicle as an electric device as example.

Referring to FIG. 1, FIG. 1 is a schematic structural diagram of a vehicle 1000 provided by some embodiments of the present application. A battery 100 is disposed inside the vehicle 1000, and the battery 100 may be disposed at a bottom, head or tail of the vehicle 1000. The battery 100 may be used for supplying power to the vehicle 1000. For example, the battery 100 may be used as an operation power supply of the vehicle 1000.

The vehicle 1000 may further include a controller 200 and a motor 300. The controller 200 is used for controlling the battery 100 to supply power to the motor 300, for example, for a working power demand of the vehicle 1000 during startup, navigation and running.

In some embodiments of the present application, the battery 100 may be used not only as an operation power supply of the vehicle 1000, but also as a driving power supply of the vehicle 1000 to replace or partially replace fuel or natural gas to provide driving power for the vehicle 1000.

Figure 2:
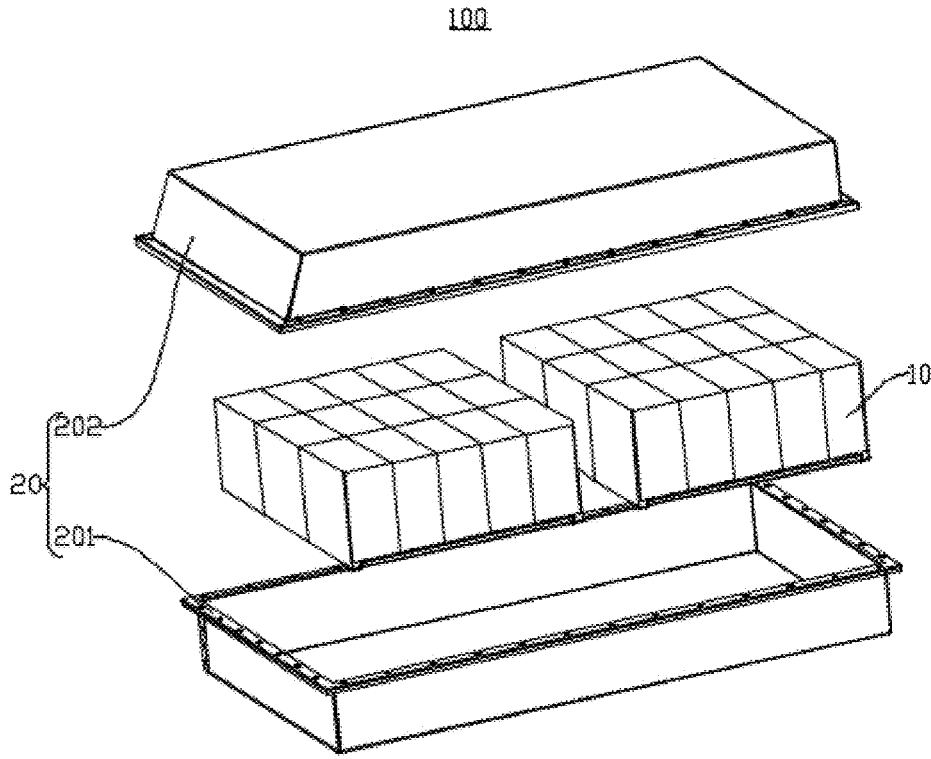
FIG. 2 is an exploded view of a battery provided by some embodiments of the present application.

Referring to FIG. 2, FIG. 2 is an exploded view of a battery 100 provided by some embodiments of the present application. The battery 100 includes battery cells 10 and a box 20, and the battery cells 10 are accommodated in the box 20.

In the above, the box 20 is a component for accommodating the battery cells 10, the box 20 provides an accommodation space for the battery cells 10, and the box 20 may be in a variety of structures. In some embodiments, the box 20 may include a first part 201 and a second part 202. The first part 201 and the second part 202 cover each other, to define an accommodation space for accommodating the battery cells 10. The first part 201 and the second part 202 may be in various shapes, such as a cuboid, a cylinder and so on. The first part 201 may be in a hollow structure having one side opened, the second part 202 may also be in a hollow structure having one side opened, and the opening side of the second part 202 covers the opening side of the first part 201, forming the box 20 having the accommodation space. It also may be that the first part 201 is in a hollow structure having one side opened, the second part 202 is in a plate-shaped structure, and the second part 202 covers the opening side of the first part 201, to form the box 20 having the accommodation space. The first part 201 and the second part 202 may be sealed by a sealing member, and the sealing member may be a sealing ring, a sealant, etc.

In the battery 100, there may be one battery cell 10, or multiple battery cells. If there are multiple battery cells 10, the multiple battery cells 10 may be in serial, parallel or hybrid connection with each other. The hybrid connection means that the multiple battery cells 10 are connected with each other both in series and in parallel. It may be that the multiple battery cells 10 are first in serial or in parallel or in hybrid connection with each other to form battery modules, and then the multiple battery modules are in serial or in parallel or in hybrid connection with each other to form a whole, and accommodated in the box 20. It may be that all battery cells 10 may be in serial, parallel or hybrid connection with each other, and then the whole composed of all of the battery cells 10 is accommodated in the box 20.

Figure 3:
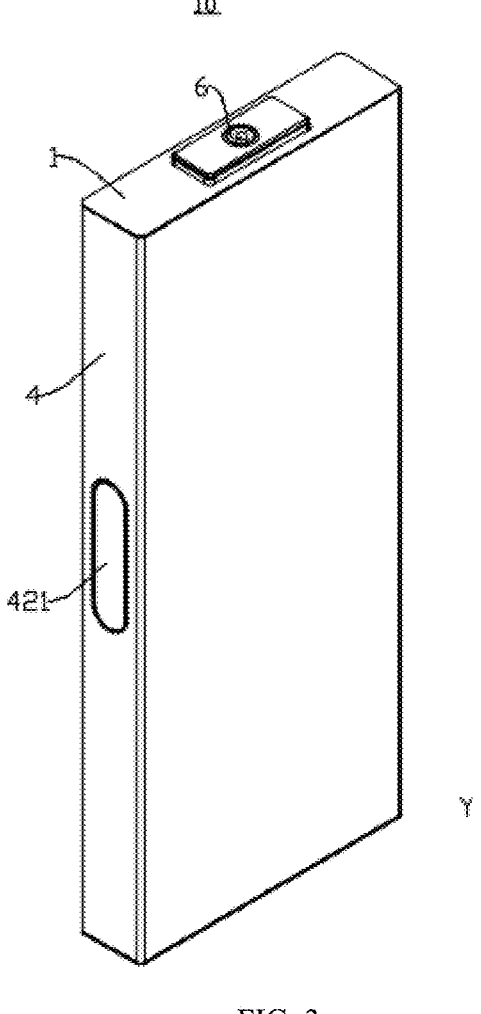
FIG. 3 is an axonometric view of a battery cell provided by some embodiments of the present application.
Figure 4:
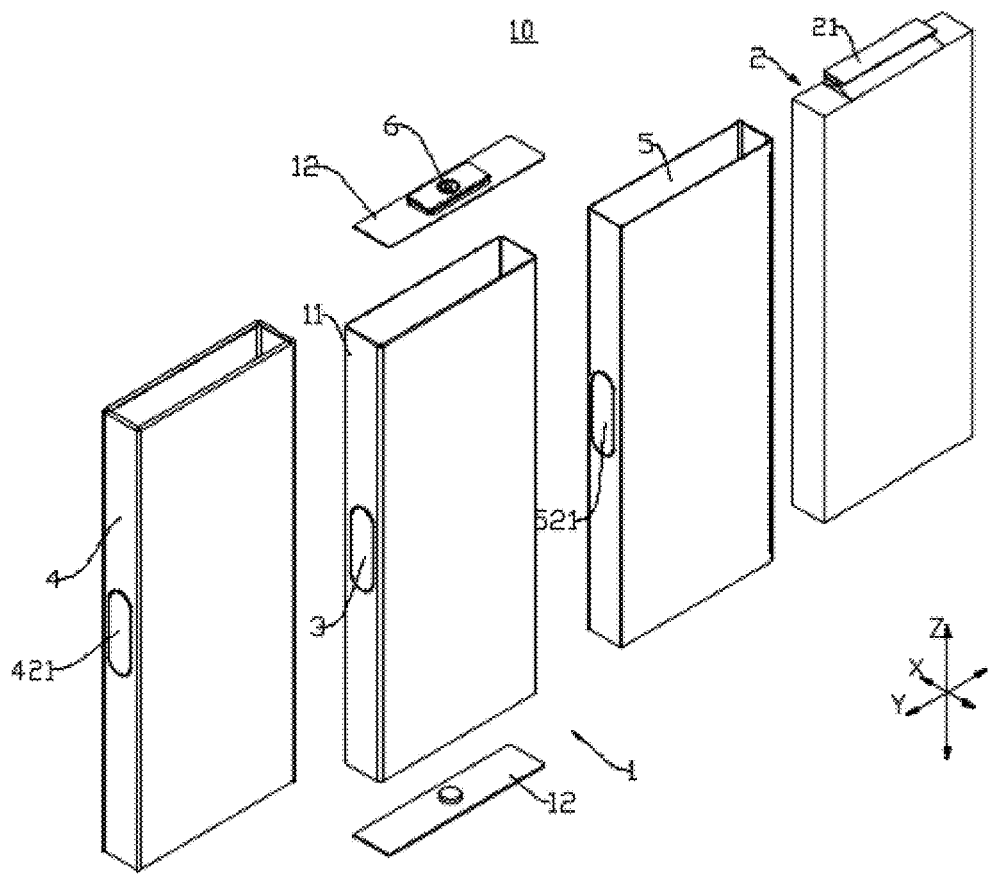
FIG. 4 is an exploded view of the battery cell shown in FIG. 3.

Referring to FIG. 3 and FIG. 4, FIG. 3 is an axonometric view of a battery cell 10 provided by some embodiments of the present application; and FIG. 4 is an exploded view of the battery cell 10 shown in FIG. 3. The battery cell 10 includes a shell 1, an electrode assembly 2, a pressure relief mechanism 3, a first insulating member 4, and a second insulating member 5.

The shell 1 is a component used to accommodate the electrode assembly 2 and the electrolyte, etc. As an example, the shell 1 may include a casing 11 and end cover(s) 12.

The casing 11 may be in a hollow structure with an opening 116 formed at one end, or the casing 11 may be a hollow structure with openings 116 formed at two opposite ends. The casing 11 may be in various shapes, such as a cylindrical shape, or polygonal/prismatic shape, and so on. The casing 11 may be made of a variety of materials, such as copper, iron, aluminum, steel, aluminum alloy, plastic, etc.

The end cover 12 is a component that seals the opening 116 of the casing 11 to isolate the internal environment of the battery cell 10 from the external environment. The end cover 12 and the casing 11 together define a receiving space for accommodating the electrode assembly 2, electrolyte and other components. The shape of the end cover 12 may be adapted to the shape of the shell 1. For example, the casing 11 is in a cuboid structure, and the end cover 12 is in a rectangular plate structure adapted to the shell 1. For another example, the casing 11 is in a cylindrical structure, and the end cover 12 is in a circular plate structure adapted to the casing 11. The end cover 12 may also be made of a variety of materials, such as copper, iron, aluminum, steel, aluminum alloy, plastic, etc. The material of the end cover 12 and the casing 11 may be the same or different. In some embodiments, in order to improve the insulation performance of the battery cell 10, an insulating patch may be provided on the outer surface of the end cover 12.

In the embodiment where the casing 11 has an opening 116 formed at one end, one end cover 12 may be provided correspondingly. In the embodiment where the casing 11 has openings 116 formed at two opposite ends, two end covers 12 may be provided correspondingly, the two end covers 12 respectively seal the two openings 116 of the casing 11, and the two end covers 12 and the casing 11 together define the receiving space.

The pressure relief mechanism 3 is a component provided on the shell 1 for releasing the internal pressure of the battery cell 10. It may be that when the internal pressure of the battery cell 10 reaches a threshold value, the discharge medium inside the battery cell 10 is discharged through the pressure relief mechanism 3, to achieve the pressure relief purpose. The discharge medium includes but not limited to: electrolytic solution, dissolved or split positive and negative electrode sheets, fragments of the separation member, gases generated by the reaction, etc.

The first insulating member 4 is a component provided on the outer side of the casing 11 to achieve insulation of the battery cell 10. The first insulating member 4 is made of an insulating material, and the first insulating member 4 may be made of plastic, rubber or other materials.

The second insulating member 5 is a component provided on the inner side of the casing 11 to achieve insulation and isolation of the casing 11 from the electrode assembly 2. The second insulating member 5 is made of an insulating material, and the second insulating member 5 may be made of plastic, rubber or other materials.

In some embodiments, the battery cell 10 may further include an electrode terminal 6, the electrode terminal 6 is provided on the shell 1. The electrode terminal 6 is used to be electrically connected to the tab 21 of the electrode assembly 2 to input or output electrical energy for the battery cell 10. The electrode terminal 6 may be provided on the casing 11 of the shell 1, or may also be provided on the end cover 12 of the shell 1. The electrode terminal 6 may be in direct connection with the tab 21, for example, the electrode terminal 6 is directly welded to the tab 21. The electrode terminal 6 may be in indirect connection with the tab 21, for example, the electrode terminal 6 is indirectly connected to the tab 21 through a current collecting member. The current collecting member may be a metal conductor, and the metal conductor may be made of copper, iron, aluminum, steel, aluminum alloy or other materials.

As an example, as shown in FIG. 4, the casing 11 is in a hollow structure with openings 116 formed at two opposite ends thereof, and end covers 12 are provided at the two opposite ends of the casing 11. Electrode terminals 6 are provided on the end covers 12 at the both ends of the casing 11, and tabs 21 are formed at the two opposite ends of the electrode assembly 2. The tab 21 at one end of the electrode assembly 2 is a positive tab, and the tab 21 at the other end of the electrode assembly 2 is a negative tab. The electrode terminal 6 on one end cover 12 is electrically connected to the positive tab, and the electrode terminal 6 on the other end cover 12 is electrically connected to the negative tab.

Figure 5:
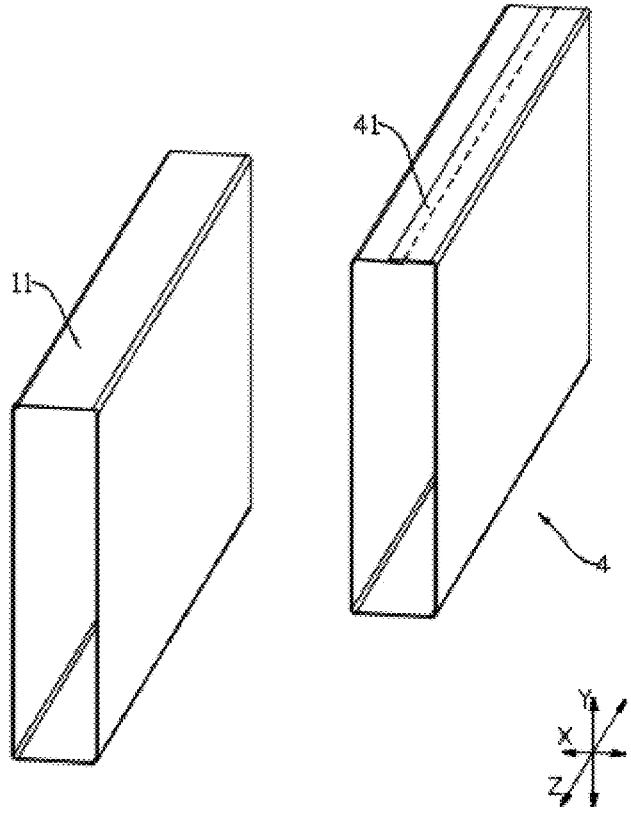
FIG. 5 is an exploded view of a casing and a first insulating member provided in some embodiments of the present application.
Figure 6:
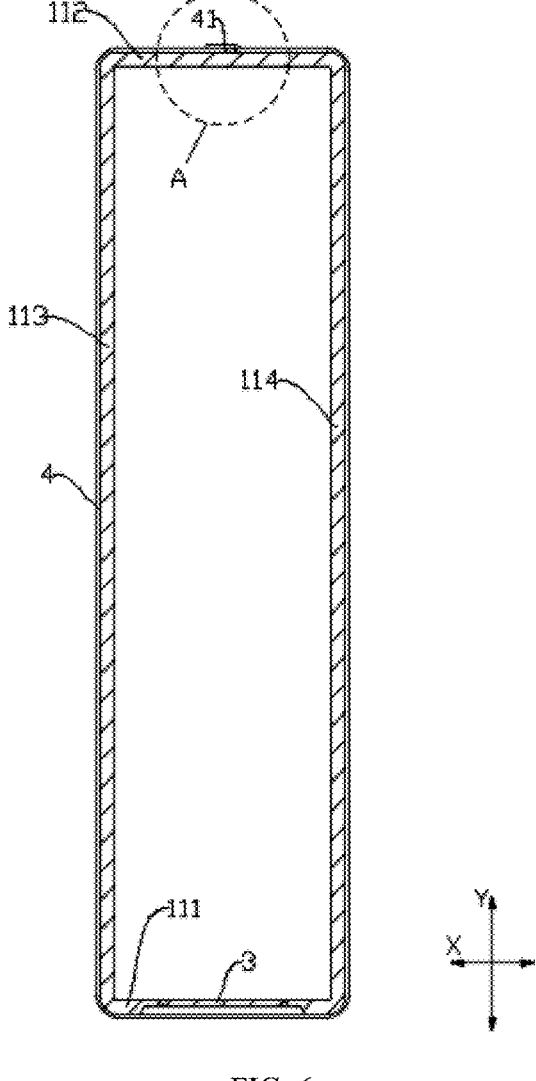
FIG. 6 is an assembly diagram of the casing and the first insulating member shown in FIG. 5.
Figure 7:
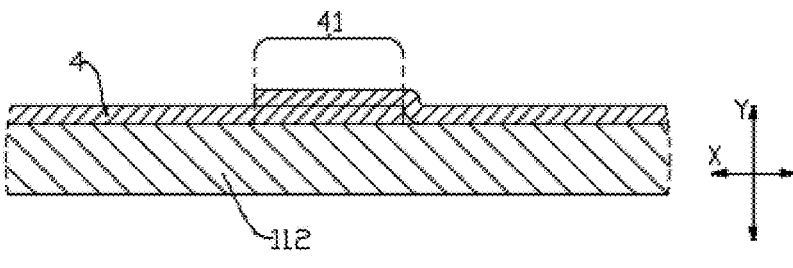
FIG. 7 is a partial enlarged view of part A of FIG. 6.

Referring to FIG. 5 to FIG. 7, FIG. 5 is an exploded view of a casing 11 and a first insulating member 4 provided in some embodiments of the present application; FIG. 6 is an assembly diagram of the casing 11 and the first insulating member 4 shown in FIG. 5; and FIG. 7 is a partial enlarged view of part A of FIG. 6. Embodiments of the present application provide a battery cell 10, including a casing 11 and a first insulating member 4. The casing 11 is provided with a pressure relief mechanism 3. The first insulating member 4 wraps the outer surface of the casing 11, the first insulating member 4 has a first overlapping region 41, and the first overlapping region 41 does not overlap with the pressure relief mechanism 3.

The casing 11 may be in a hollow structure with an opening 116 formed at one end, or with openings 116 formed at two opposite ends. The casing 11 may be in a prism shape, a cylindrical shape, or the like. The prism may be a triangular prism, a quadrangular prism, a pentagonal prism, a hexagonal prism, or the like. The first insulating member 4 may be an insulating film covering the outer surface of the casing 11. The first insulating member 4 may be fixed to the casing 11, for example, the first insulating member 4 is bonded to the casing 11.

Taking the case where the casing 11 is in a prism shape as an example, the casing 11 may include a plurality of wall parts, and the plurality of wall parts together define an internal space of the casing 11. The first insulating member 4 may cover the outer surfaces of all wall parts, and the first insulating member 4 may also cover the outer surfaces of some of the wall parts. In the embodiment where the casing 11 has an opening 116 formed at one end thereof, it may be that the first insulating member 4 covers the outer surfaces of the multiple wall parts of the casing 11 arranged in the circumferential direction of the opening 116, but does not covers the outer surfaces of the wall parts of the casing 11 opposite to the opening 116; or it may be also that the first insulating member 4 covers both the outer surfaces of the multiple wall parts of the casing 11 arranged in the circumferential of the opening 116 and the outer surfaces of the wall parts of the casing 11 opposite to the opening 116. In the embodiment where the casing 11 has openings 116 formed at two opposite ends thereof, the first insulating member 4 may cover outer surfaces of multiple wall parts of the casing 11 provided in the circumferential direction of the opening 116.

Similarly, there may be one or more pressure relief mechanisms 3 on the casing 11. The pressure relief mechanism 3 may be integrally formed with the casing 11; the pressure relief mechanism 3 and the casing 11 may also be provided separately, and the pressure relief mechanism 3 is installed on the casing 11. For example, the pressure relief mechanism 3 is an explosion-proof disc, explosion-proof valve, safety valve, etc. installed on the first wall part 111.

The first overlapping region 41 is a part formed by stacking at least two portions of the first insulating member 4 together, and the thickness of the first overlapping region 41 is larger than the thicknesses of other portions of the first insulating member 4. The first overlapping region 41 may be of a multi-layer structure formed by stacking a plurality of portions of the first insulating member 4 after wrapping the outer surface of the casing 11. The first overlapping region 41 may be in a two-layer structure, a three-layer structure, a four-layer structure, a five-layer structure, etc. There may be one or more first overlapping regions 4 on the first insulating member 4.

The first overlapping region 41 does not overlap with the pressure relief mechanism 3. It is understandable that the first overlapping region 41 does not cover the pressure relief mechanism 3, and the first overlapping region 41 does not block the pressure relief mechanism 3. The first overlapping region 41 and the pressure relief mechanism 3 may be provided corresponding to the same wall part of the casing 11, or the first overlapping region 41 and the pressure relief mechanism 3 may be provided corresponding to two wall parts of the casing 11, respectively.

In the embodiments of the present application, the first overlapping region 41 of the first insulating member 4 does not overlap with the pressure relief mechanism 3, such that the first overlapping region 41 of the first insulating member 4 does not block the pressure relief mechanism 3, thereby reducing the risk of the pressure relief mechanism 3 failing to release pressure in time due to that the first overlapping region 41 of the first insulating member 4 blocks the pressure relief mechanism 3, improving the timeliness of pressure relief of the pressure relief mechanism 3 and improving the reliability of the battery cell 10.

In some embodiments, continuing to refer to FIG. 6, the casing 11 includes a first wall part 111 and a second wall part 112, the pressure relief mechanism 3 is provided on the first wall part 111, and the first overlapping region 41 is provided on an outer surface of the second wall part 112.

The first wall part 111 and the second wall part 112 are two wall parts of the casing 11. The first wall part 111 and the second wall part 112 may be two adjacent wall parts of the casing 11, or may be two opposite wall parts of the casing 11. In the embodiment shown in FIG. 6, the first wall part 111 and the second wall part 112 are provided opposite to each other.

The first insulating member 4 may cover the outer surface of the first wall part 111 and the outer surface of the second wall part 112, and the first insulating member 4 may also cover the outer surface of the second wall part 112, but not cover the outer surface of the first wall part 111.

The pressure relief mechanism 3 may be integrally formed with the first wall part 111; and the pressure relief mechanism 3 and the first wall part 111 may also be provided separately, and the pressure relief mechanism 3 is installed on the first wall part 111. The first overlapping region 41 may cover all of the outer surface of the second wall part 112, or may also cover a part of the outer surface of the second wall part 112.

In the present embodiment, the pressure relief mechanism 3 and the first overlapping region 41 are respectively located on the two wall parts, further reducing the influence of the first overlapping region 41 on the pressure relief mechanism 3.

In some embodiments, the first insulating member 4 covers the outer surface of the first wall part 111 and the outer surface of the second wall part 112.

The first insulating member 4 may cover all of the outer surface of the first wall part 111, or may also cover a part of the outer surface of the first wall part 111; and the first insulating member 4 may also cover all of the outer surface of the second wall part 112, or may also cover a part of the outer surface of the second wall part 112. The first insulating member 4 may only cover the outer surface of the first wall part 111 and the outer surface of the second wall part 112. For example, the first wall part 111 and the second wall part 112 are two adjacent wall parts of the casing 11, and the first insulating member 4 may only cover the outer surface of the first wall part 111 and the outer surface of the second wall part 112. The first insulating member 4 may also cover other wall parts of the casing 11. For example, as shown in FIG. 6, the first wall part 111 and the second wall part 112 are provided opposite to each other, and the first insulating member 4 also covers the wall part of the casing 11 connecting the first wall part 111 and the second wall part 112.

In the present embodiment, the first insulating member 4 covers the outer surface of the first wall part 111 and the outer surface of the second wall part 112, realizing insulation of the first wall part 111 and the second wall part 112 from external components, improving the insulation performance of the battery cell 10, and reducing the risk of short circuit of the battery cell 10.

In some embodiments, the casing 11 further includes a third wall part 113 and a fourth wall part 114, the third wall part 113 and the fourth wall part 114 are provided opposite to each other in the thickness direction of the battery cell 10, and the first wall part 111 and the second wall part 112 are both connected to the third wall part 113 and the fourth wall part 114.

The third wall part 113 and the fourth wall part 114 are two wall parts of the casing 11 opposite to each other in the thickness direction of the battery cell 10. The third wall part 113 and the fourth wall part 114 may be two wall parts of the casing 11, with the outer surfaces of the two wall parts having the largest area. The first wall part 111 and the second wall part 112 are both connected to the third wall part 113 and the fourth wall part 114, and the first wall part 111 and the second wall part 112 may be two adjacent wall parts, or may also be two opposite wall parts. The first wall part 111, the second wall part 112, the third wall part 113 and the fourth wall part 114 may be integrally formed. The casing 11 may also be formed by bending a plate, to correspondingly form the first wall part 111, the second wall part 112, the third wall part 113 and the fourth wall part 114.

The third wall part 113 and the fourth wall part 114 are provided opposite to each other in a first direction X. The first direction X is the thickness direction of the battery cell 10, and the first direction X is also the width direction of the casing 11. Taking a square-shell battery cell as an example, the thickness of the battery cell 10 is smaller than the length and height of the battery cell 10, and any two of the thickness direction, length direction and height direction of the battery cell 10 are perpendicular to each other.

In the present application, the third wall part 113 and the fourth wall part 114 are two wall parts of the casing 11 that are provided opposite to each other in the thickness direction of the battery cell 10. When the electrode assembly 2 inside the casing 11 expands, the electrode assembly 2 has a larger expansion amount in the thickness direction of the battery cell 10, and the deformation amounts of the third wall part 113 and the fourth wall part 114 are greater than those of the first wall part 111 and the second wall part 112. Since the pressure relief mechanism 3 is provided on the first wall part 111, the influence of the expansion of the electrode assembly 2 on the pressure relief mechanism 3 may be reduced, thereby increasing the service life of the pressure relief mechanism 3. Since the first overlapping region 41 of the first insulating member 4 is disposed on the outer surface of the second wall part 112, the first overlapping region 41 is not located in the thickness direction of the battery cell 10, and the first overlapping region 41 does not occupy the expansion space of the battery cell 10 extending in the thickness direction, thereby providing more expansion space for the battery cell 10 and prolonging the service life of the battery cell 10.

In some embodiments, continuing to refer to FIG. 6, the first wall part 111 and the second wall part 112 are provided opposite to each other, and the first wall part 111, the third wall part 113, the second wall part 112, and the fourth wall part 114 are connected end to end in sequence.

The first wall part 111 and the second wall part 112 are two wall parts of the casing 11 opposite to each other. The first wall part 111 and the second wall part 112 are provided opposite to each other in a second direction Y. The second direction Y may be perpendicular to the first direction X. The second direction Y may be a height direction of the casing 11. The casing 11 may be in a cuboid shape.

In the present embodiment, the pressure relief mechanism 3 and the first overlapping region 41 are respectively located on the two opposite wall parts of the casing 11, such that the pressure relief mechanism 3 and the first overlapping region 41 are farther apart from each other, further reducing the influence of the first overlapping region 41 on the pressure relief mechanism 3.

Figure 8:
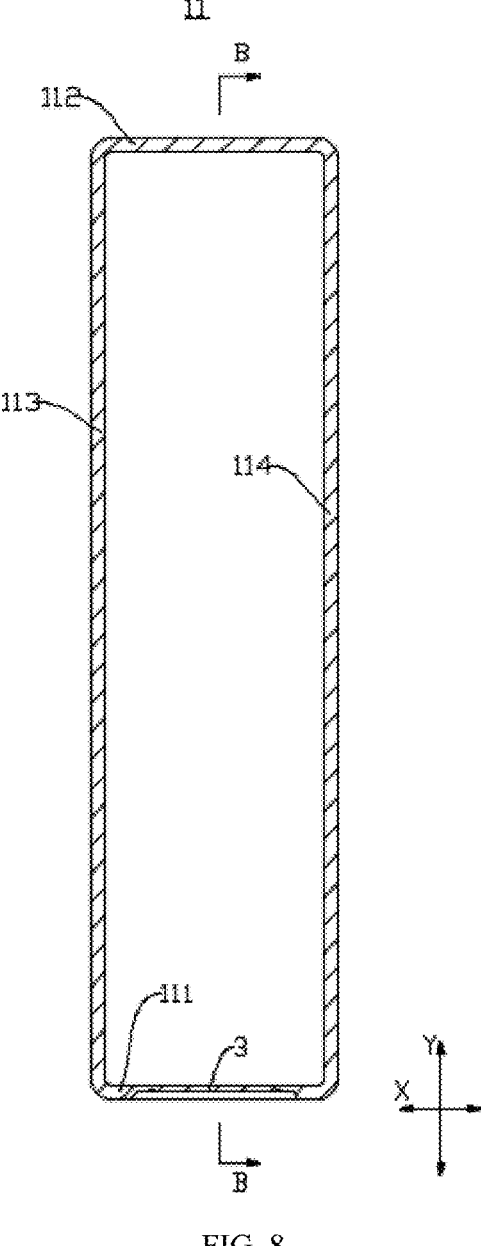
FIG. 8 is a schematic structural diagram of the casing shown in FIG. 6.
Figure 9:
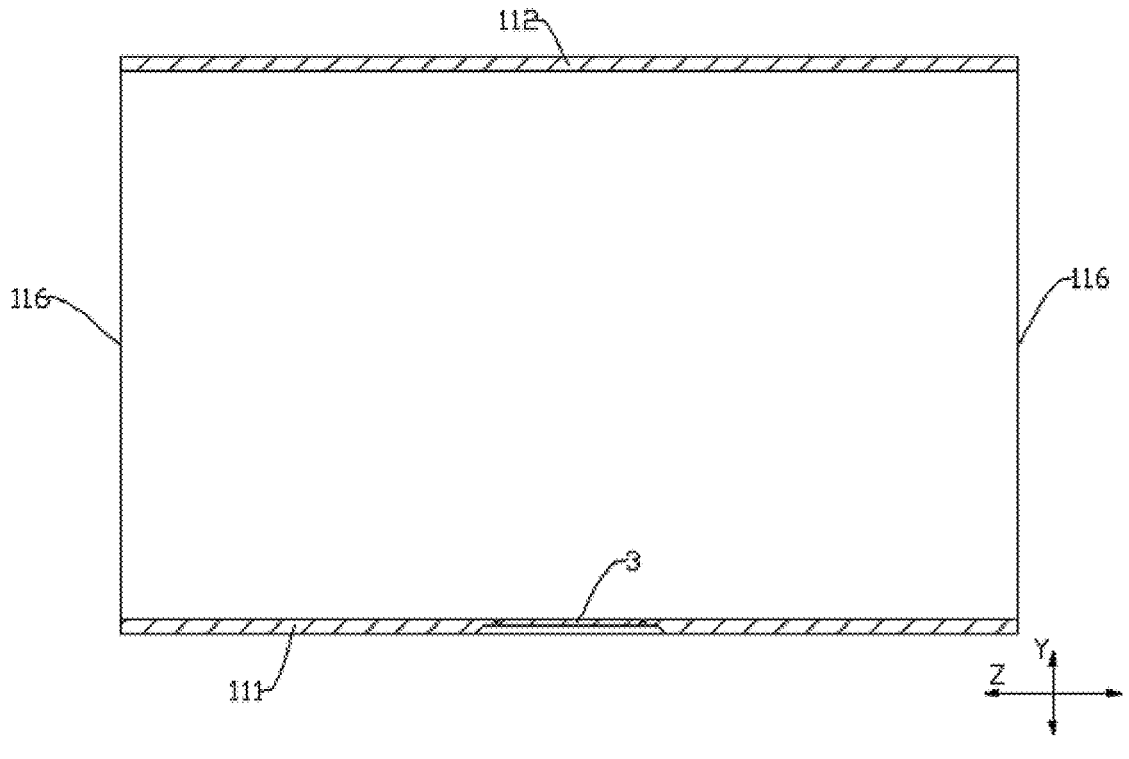
FIG. 9 is a B-B cross-sectional view of the casing shown in FIG. 8.

In some embodiments, referring to FIG. 8 and FIG. 9, FIG. 8 is a schematic structural diagram of the casing 11 shown in FIG. 6; and FIG. 9 is a B-B cross-sectional view of the casing 11 shown in FIG. 8. Openings 116 are formed at two opposite ends of the casing 11, and the first wall part 111, the third wall part 113, the second wall part 112 and the fourth wall part 114 are sequentially provided in the circumferential directions of the openings 116.

It can be understood that the casing 11 may be in a hollow structure with openings 116 formed at two opposite ends thereof. The two openings 116 of the casing 11 are provided opposite to each other in the third direction Z. Any two of the third direction Z, the second direction Y and the first direction X may be perpendicular to each other. The third direction Z may be the length direction of the casing 11. As an example, the opening 116 is of a rectangle, and the arrangement direction of the four sides of the rectangle is the circumferential direction of the opening 116. The first wall part 111, the third wall part 113, the second wall part 112 and the fourth wall part 114 are respectively located at the four sides of the rectangle.

In the battery cell 10, two end covers 12 may be provided correspondingly, and the two end covers 12 respectively seal the two openings 116 of the casing 11.

The first wall part 111, the third wall part 113, the second wall part 112 and the fourth wall part 114 form a casing 11 with openings formed at two opposite ends thereof. The casing 11 of this structure is simple in structure. When assembling a battery cell 10, the electrode assembly 2 may enter the casing 11 from any opening 116 of the casing 11, which can improve the efficiency of the electrode assembly 2 entering the casing.

In some embodiments, continuing to refer to FIG. 6, the first insulating member 4 covers the outer surface of the first wall part 111, the outer surface of the second wall part 112, the outer surface of the third wall part 113 and the outer surface of the fourth wall part 114.

The first insulating member 4 may cover all of the outer surface of the first wall part 111, or may also cover a part of the outer surface of the first wall part 111; the first insulating member 4 may cover all of the outer surface of the second wall part 112, or may also cover a part of the outer surface of the second wall part 112; the first insulating member 4 may cover all of the outer surface of the third wall part 113, or may also cover a part of the outer surface of the third wall part 113; and the first insulating member 4 may cover all of the outer surface of the fourth wall part 114, or may also cover a part of the outer surface of the fourth wall part 114.

The first insulating member 4 may wrap the outer surface of the casing 11 in the circumferential direction of the opening 116, to cover the outer surface of the first wall part 111, the outer surface of the second wall part 112, the outer surface of the third wall part 113, and the outer surface of the fourth wall part 114.

In the present embodiment, the first insulating member 4 achieves insulation of the first wall part 111, the second wall part 112, the third wall part 113, and the fourth wall part 114 from external components, thereby improving the insulation performance of the battery cell 10 and reducing the risk of short circuit of the battery cell 10.

Figure 10:
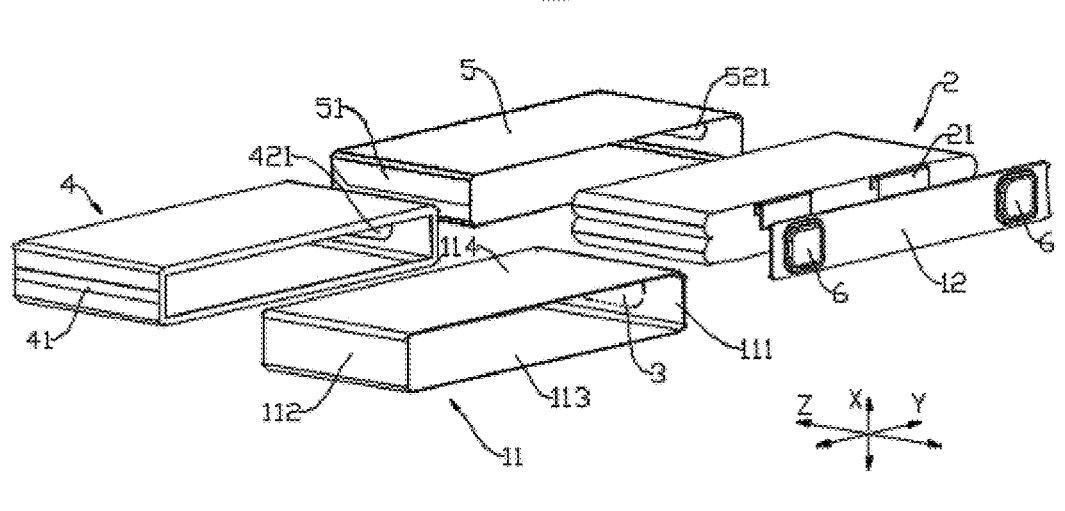
FIG. 10 is an exploded view of a battery cell provided by other embodiments of the present application.
Figure 11:
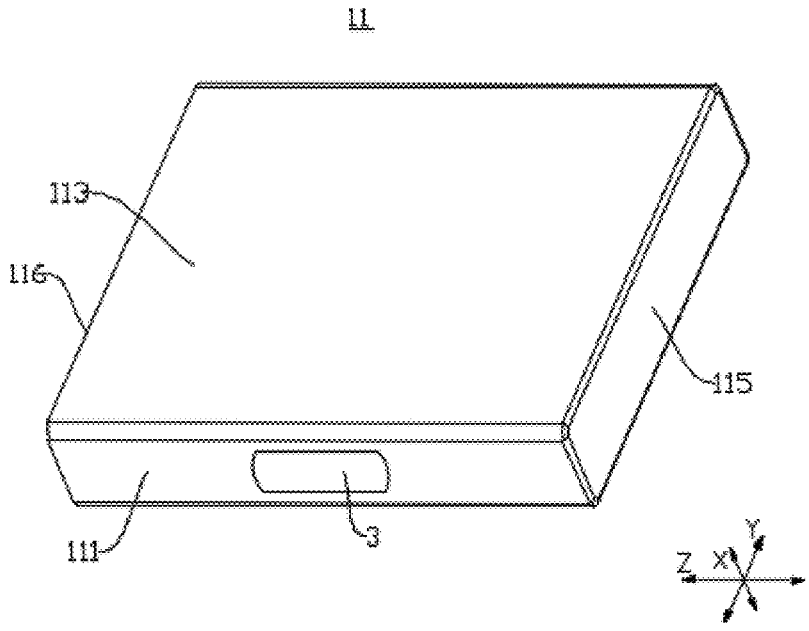
FIG. 11 is an axonometric view of the casing shown in FIG. 10.

In some embodiments, referring to FIG. 10 and FIG. 11, FIG. 10 is an exploded view of a battery cell 10 provided by other embodiments of the present application; FIG. 11 is an axonometric view of the casing 11 shown in FIG. 10. The casing 11 further includes a fifth wall part 115, where the first wall part 111, the third wall part 113, the second wall part 112 and the fourth wall part 114 are provided surrounding the fifth wall part 115, and the casing 11 is provided with an opening 116 at one end thereof opposite to the fifth wall part 115.

It can be understood that the casing 11 may be in a hollow structure with an opening 116 formed at one end. In the battery cell 10, one end cover 12 may be provided correspondingly, and the end cover 12 seals the opening 116 of the casing 11. The end cover may be provided with two electrode terminals 6. The two electrode terminals 6 are electrically connected to two tabs 21 of the electrode assembly 2 respectively. The two tabs 21 have opposite polarities and are located at one end of the electrode assembly 2 facing the end cover 12.

The first wall part 111, the second wall part 112, the third wall part 113 and the fourth wall part 114 may be four wall parts of the casing 11 provided surrounding the fifth wall part 115. The first wall part 111, the second wall part 112, the third wall part 113, the fourth wall part 114 and the fifth wall part 115 may be integrally formed. The casing 11 may also be formed by bending a plate, to correspondingly form the first wall part 111, the second wall part 112, the third wall part 113, the fourth wall part 114, and the fifth wall part 115.

The first insulating member 4 may cover the outer surface of the first wall part 111, the outer surface of the second wall part 112, the outer surface of the third wall part 113, and the outer surface of the fourth wall part 114, and the first insulating member 4 does not cover the outer surface of the fifth wall part 115; or the first insulating member 4 may cover the outer surface of the first wall part 111, the outer surface of the second wall part 112, the outer surface of the third wall part 113, the outer surface of the fourth wall part 114, and the outer surface of the fifth wall part 115.

As an example, the third wall part 113 and the fourth wall part 114 are provided opposite to each other in the first direction X, the first wall part 111 and the second wall part 112 are provided opposite to each other in the second direction Y, the opening 116 of the casing 11 and the fifth wall part 115 are arranged opposite to each other in a third direction Z, and any two of the first direction X, the second direction Y and the third direction Z are perpendicular to each other.

In the present embodiment, the casing 11 is provided with only one opening 116, and the fifth wall part 115 is connected with the first wall part 111, the second wall part 112, the third wall part 113 and the fourth wall part 114, so that the casing 11 has better structural stability and is not easy to deform. When assembling the battery cell 10, after the electrode assembly 2 is installed into the casing 11 through the opening 116, only one opening 116 of the casing 11 needs to be sealed, which can effectively improve the assembly efficiency of the battery cell 10.

Figure 12:
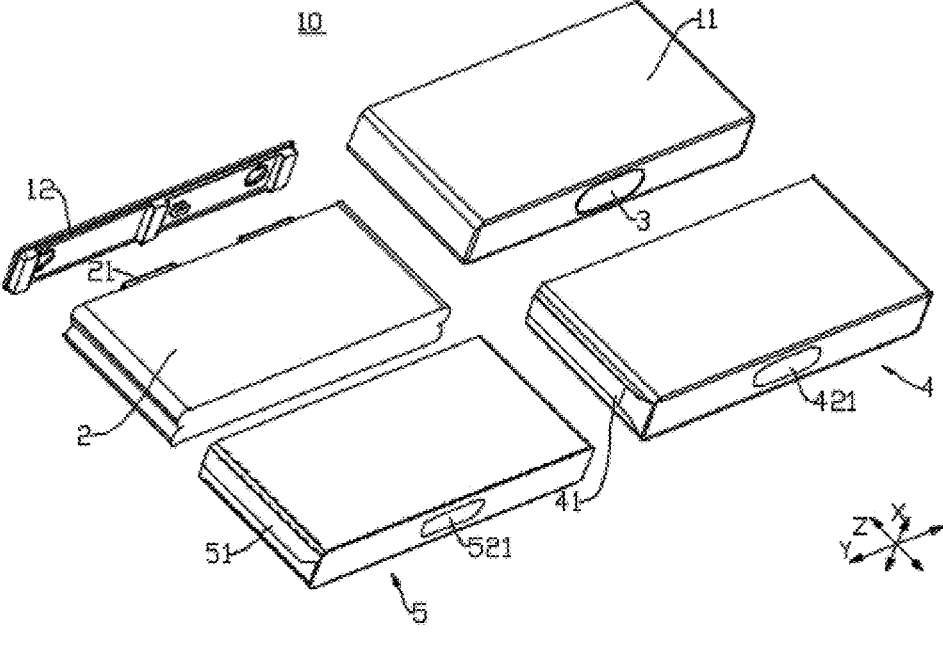
FIG. 12 is an exploded view of a battery cell provided by yet some embodiments of the present application.
Figure 13:
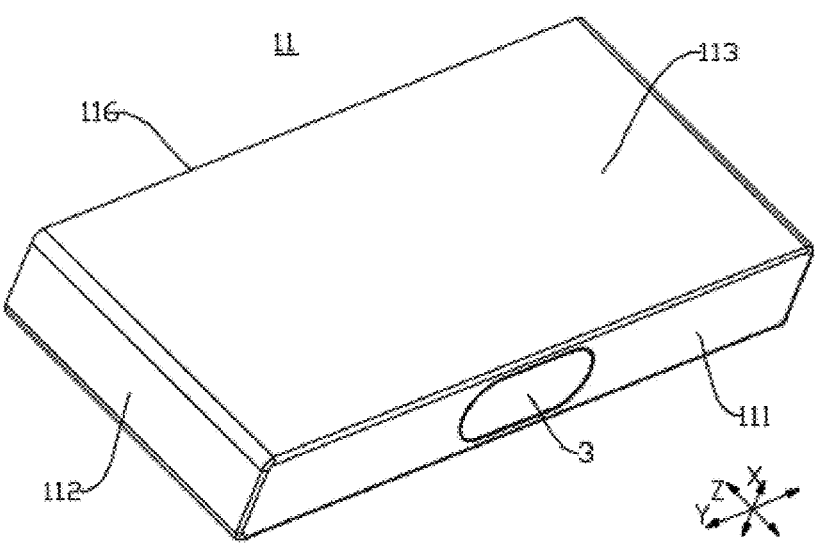
FIG. 13 is an axonometric view of the casing shown in FIG. 12.
Figure 14:
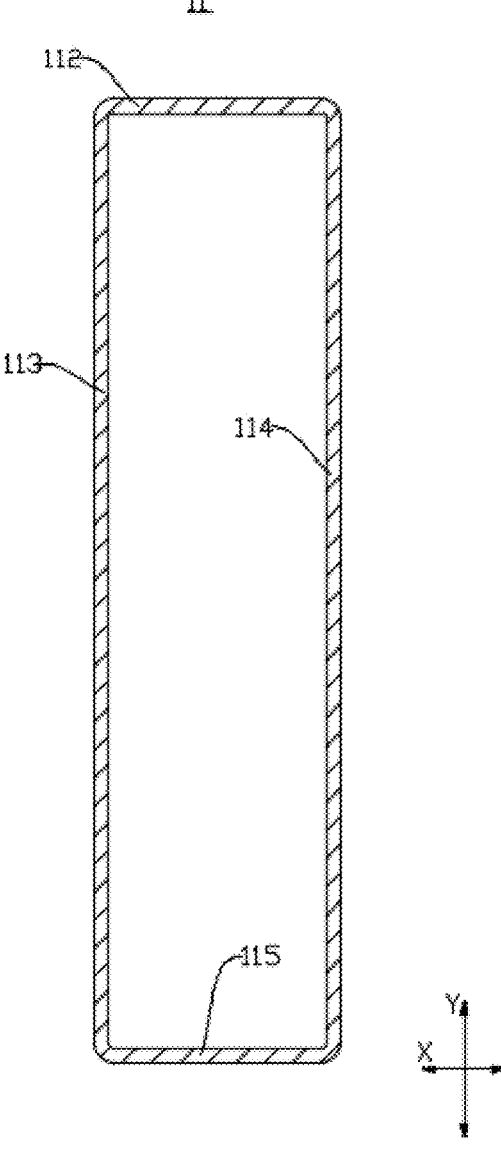
FIG. 14 is a schematic structural diagram of the casing shown in FIG. 13.

In some embodiments, referring to FIG. 12 to FIG. 14, FIG. 12 is an exploded view of a battery cell 10 provided by yet some embodiments of the present application; FIG. 13 is an axonometric view of the casing 11 shown in FIG. 12; and FIG. 14 is a schematic structural diagram of the casing 11 shown in FIG. 13. The casing 11 further includes a fifth wall part 115, where the second wall part 112 and the fifth wall part 115 are provided opposite to each other, the second wall part 112, the third wall part 113, the fifth wall part 115 and the fourth wall part 114 are connected end to end in sequence, and provided surrounding the first wall part 111, and the casing 11 is provided with an opening 116 at one end thereof opposite to the first wall part 111.

The second wall part 112, the third wall part 113, the fifth wall part 115, and the fourth wall part 114 may be four sidewalls of the casing 11 provided surrounding the first wall part 111. The first wall part 111 and the second wall part 112 are two adjacent wall parts of the casing 11. The first wall part 111, the second wall part 112, the third wall part 113, the fourth wall part 114 and the fifth wall part 115 may be integrally formed. The casing 11 may also be formed by bending a plate, to correspondingly form the first wall part 111, the second wall part 112, the third wall part 113, the fourth wall part 114, and the fifth wall part 115.

The first wall part 111 is a wall part of the casing 11 provided with the pressure relief mechanism 3, and the first insulating member 4 may cover the outer surface of the first wall part 111, or may also not cover the outer surface of the first wall part 111.

As an example, the casing 11 is a cuboid shape, the third wall part 113 and the fourth wall part 114 are provided opposite to each other in the first direction X, the second wall part 112 and the fifth wall part 115 are provided opposite to each other in the second direction Y, the opening 116 of the casing 11 and the first wall part 111 are arranged opposite to each other in a third direction Z, and any two of the first direction X, the second direction Y and the third direction Z are perpendicular to each other. In the above, the first direction X is the thickness direction of the battery cell 10.

The pressure relief mechanism 3 is provided on the first wall part 111, that is, the pressure relief mechanism 3 is provided on the wall part of the casing 11 opposite to the opening 116, such that when the battery cell 10 has thermal runaway, the discharge medium generated by the electrode assembly 2 may quickly reach the pressure relief mechanism 3 to achieve rapid pressure relief.

In some embodiments, continuing to refer to FIG. 12 to FIG. 14, the first insulating member 4 covers the outer surface of the first wall part 111, the outer surface of the second wall part 112, the outer surface of the third wall part 113, the outer surface of the fourth wall part 114, and the outer surface of the fifth wall part 115.

The first insulating member 4 may cover all of the outer surface of the first wall part 111, or may also cover a part of the outer surface of the first wall part 111; the first insulating member 4 may cover all of the outer surface of the second wall part 112, or may also cover a part of the outer surface of the second wall part 112; the first insulating member 4 may cover all of the outer surface of the third wall part 113, or may also cover a part of the outer surface of the third wall part 113; the first insulating member 4 may cover all of the outer surface of the fourth wall part 114, or may also cover a part of the outer surface of the fourth wall part 114; and the first insulating member 4 may cover all of the outer surface of the fifth wall part 115, or may also cover a part of the outer surface of the fifth wall part 115.

The first insulating member 4 may wrap the outer surface of the casing 11 in a folding way, enabling the first insulating member 4 to cover the outer surface of the first wall part 111, the outer surface of the second wall part 112, the outer surface of the third wall part 113, the outer surface of the fourth wall part 114, and the outer surface of the fifth wall part 115. The first insulating member 4 may be a flat film before molding. When folding, the first insulating member 4 may be firstly provided at the bottom of the first wall part 111, so that the first insulating member 4 covers the outer surface of the first wall part 111, and then the four sides of the first insulating member 4 are folded upwards so that the first insulating member 4 covers the outer surface of the second wall part 112, the outer surface of the third wall part 113, the outer surface of the fourth wall part 114 and the outer surface of the fifth wall part 115. As an example, the region of the first insulating member 4 corresponding to the second wall part 112 forms a first overlapping region 41, and the region of the second insulating member 5 corresponding to the fifth wall part 115 also form the first overlapping region 41.

In the present embodiment, the first insulating member 4 achieves insulation of the first wall part 111, the second wall part 112, the third wall part 113, the fourth wall part 114 and the fifth wall part 115 from external components, thereby improving the insulation performance of the battery cell 10 and reducing the risk of short circuit of the battery cell 10.

Figure 15:
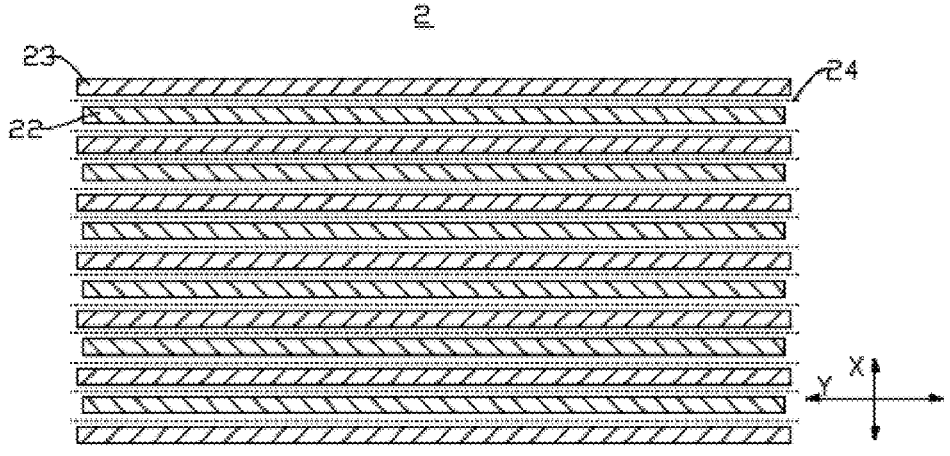
FIG. 15 is a schematic structural diagram of an electrode assembly provided by some embodiments of the present application.

In some embodiments, referring to FIG. 15, FIG. 15 is a schematic structural diagram of an electrode assembly 2 provided by some embodiments of the present application. The battery cell 10 further includes an electrode assembly 2. At least a part of the electrode assembly 2 is accommodated in the casing 11. The electrode assembly 2 includes a positive electrode sheet 22 and a negative electrode sheet 23. The electrode assembly 2 is in a laminated structure, in which the positive electrode sheet 22 and the negative electrode sheet 23 are stacked in the thickness direction of the battery cell 10.

As an example, as shown in FIG. 15, there may be multiple positive electrode sheets 22 and multiple negative electrode sheets 23, and the multiple positive electrode sheets 22 and the multiple negative electrode sheets 23 are alternately stacked in the thickness direction of the battery cell 10 to achieve that the positive electrode sheets 22 and the negative electrode sheets 23 are stacked in the thickness direction of the battery cell 10. The first direction X is the thickness direction of the battery cell 10.

As an example, there may be multiple positive electrode sheets 22 and multiple negative electrode sheets 23, the positive electrode sheet 22 is folded to form a plurality of folded segments, and the plurality of folded segments and the multiple negative electrode sheets 23 are alternately provided in the thickness direction of the battery cell 10, to achieve that the positive electrode sheets 22 and the negative electrode sheets 23 are stacked in the thickness direction of the battery cell 10.

As an example, the electrode assembly 2 may further include at least one separation member 24, and the separation member 24 is provided between the positive electrode sheet 22 and the negative electrode sheet 23 to insulate and isolate the positive electrode sheet 22 and the negative electrode sheet 23.

In the present embodiments, the electrode assembly 2 is in the laminated structure, and the bending of the electrode sheets is reduced, which may effectively reduce lithium precipitation of the electrode assembly 2. Since the stacking direction of the positive electrode sheet 22 and the negative electrode sheet 23 is consistent with the thickness direction of the battery cell 10, the electrode assembly 2 has larger expansion amount in the thickness direction of the battery cell 10 when expanding, and the first wall part 111 is less affected when the electrode assembly 2 expands, reducing the influence of the expansion of the electrode assembly 2 on the pressure relief mechanism 3.

Figure 16:
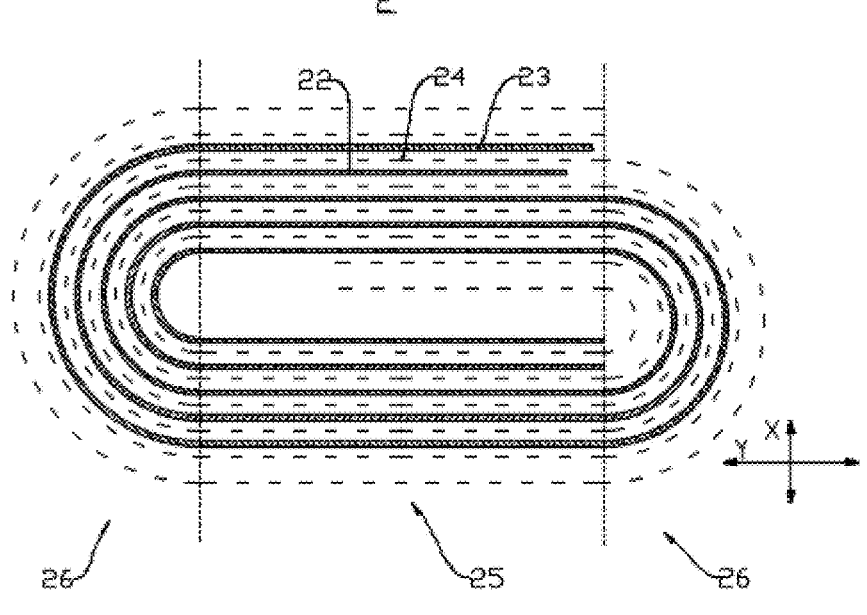
FIG. 16 is a schematic structural diagram of an electrode assembly provided by other embodiments of the present application.

In some embodiments, referring to FIG. 16, FIG. 16 is a schematic structural diagram of an electrode assembly 2 provided by other embodiments of the present application. The battery cell 10 further includes an electrode assembly 2. At least a part of the electrode assembly 2 is accommodated in the casing 11. The electrode assembly 2 includes a positive electrode sheet 22 and a negative electrode sheet 23. The electrode assembly 2 is in a wound structure, the electrode assembly 2 has a straight region 25, portions of the positive electrode sheet 22 and the negative electrode sheet 23 located in the straight region 25 are stacked in the thickness direction of the battery cell 10.

As an example, the electrode assembly 2 may further include at least one separation member 24, and the separation member 24 is provided between the positive electrode sheet 22 and the negative electrode sheet 23 to insulate and isolate the positive electrode sheet 22 and the negative electrode sheet 23.

As an example, the electrode assembly 2 further has bending regions 26, and two ends of the straight region 25 are each provided with the bending region 26. The portions of the positive electrode sheet 22 and the negative electrode sheet 23 located in the straight region 25 are in a flat straight state, and the portions of them located in the bending region 26 are in a bending state. For example, the portions of the positive electrode sheet 22 and the negative electrode sheet 23 located in the bending region 26 are both arc-shaped. In the above, the first direction X is the thickness direction of the battery cell 10, and two ends of the straight region 25 in the second direction Y are each provided with the bending region 26.

In the present embodiment, the electrode assembly 2 is in a wound structure, the forming efficiency of the electrode assembly 2 is higher. Since the stacking direction of the portions of the positive electrode sheet 22 and the negative electrode sheet 23 located in the straight region 25 is consistent with the thickness direction of the battery cell 10, the electrode assembly 2 has larger expansion amount in the thickness direction of the battery cell 10 when expanding, and the first wall part 111 is less affected when the electrode assembly 2 expands, reducing the influence of the expansion of the electrode assembly 2 on the pressure relief mechanism 3.

In some embodiments, referring to what is shown in FIG. 8 to FIG. 14, the first wall part 111 and/or the second wall part 112 are parallel to the thickness direction of the battery cell 10.

The first wall part 111 may be a wall part parallel to the thickness direction of the battery cell 10, so that the pressure relief mechanism 3 is located at the wall part of the casing 11 parallel to the thickness direction of the battery cell 10; the second wall part 112 may be a wall part parallel to the thickness direction of the battery cell 10, so that the first overlapping region 41 is provided corresponding to the wall part of the casing 11 parallel to the thickness direction of the battery cell 10.

In FIG. 8 to FIG. 14, the first direction X is the thickness direction of the battery cell 10. In the above, in the embodiments shown in FIG. 8 to FIG. 11, the first wall part 111 and the second wall part 112 are both parallel to the thickness direction of the battery cell 10, the first wall part 111 and the second wall part 112 are two opposite wall parts of the casing 11, and the first wall part 111 and the second wall part 112 are arranged opposite to each other in the second direction Y. In the embodiment shown in FIG. 12 to FIG. 14, the first wall part 111 and the second wall part 112 are both parallel to the thickness direction of the battery cell 10. The first wall part 111 and the second wall part 112 may be two adjacent wall parts of the casing 11.

When the electrode assembly 2 inside the casing 11 expands, the electrode assembly 2 has larger expansion amount in the thickness direction of the battery cell 10. If the first wall part 111 is parallel to the thickness direction of the battery cell 10, since the pressure relief mechanism 3 is provided on the first wall part 111, the influence of the expansion of the electrode assembly 2 on the pressure relief mechanism 3 may be reduced, thereby increasing the service life of the pressure relief mechanism 3. If the second wall part 112 is parallel to the thickness direction of the battery cell 10, since the first overlapping region 41 of the first insulating member 4 is disposed on the outer surface of the second wall part 112, the first overlapping region 41 is not located in the thickness direction of the battery cell 10, and the first overlapping region 41 does not occupy the expansion space of the battery cell 10 expanding in the thickness direction, thereby providing more expansion space for the battery cell 10 and prolonging the service life of the battery cell 10.

Figure 17:
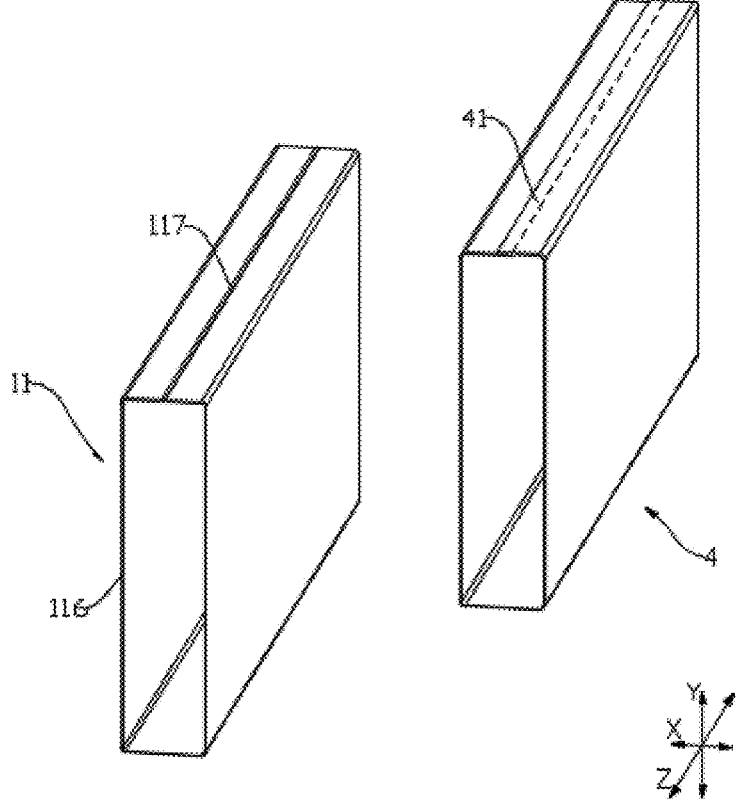
FIG. 17 is an exploded view of a casing and a first insulating member provided in other embodiments of the present application.
Figure 18:
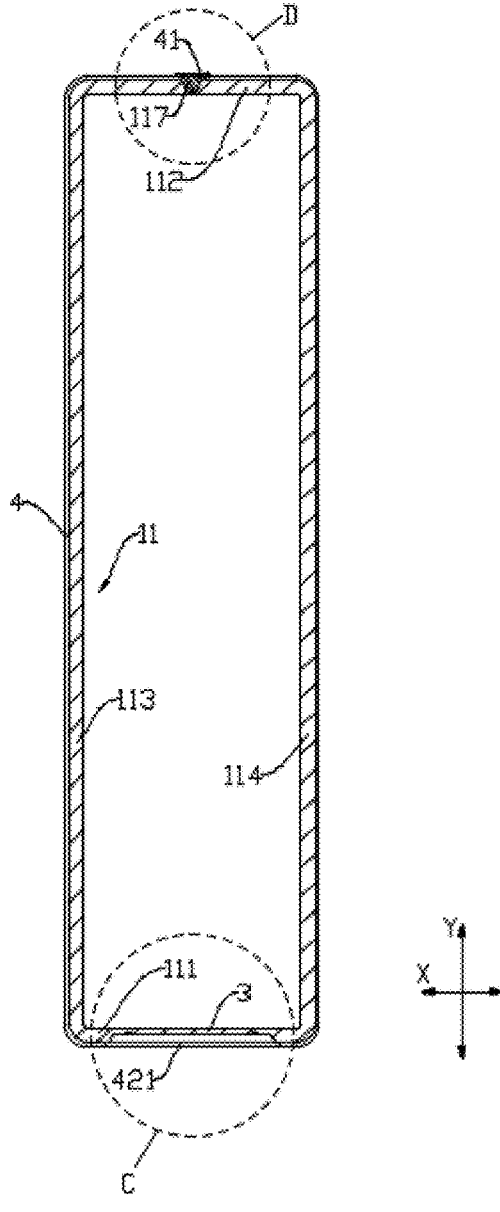
FIG. 18 is an assembly diagram of the casing and the first insulating member shown in FIG. 17.
Figure 19:
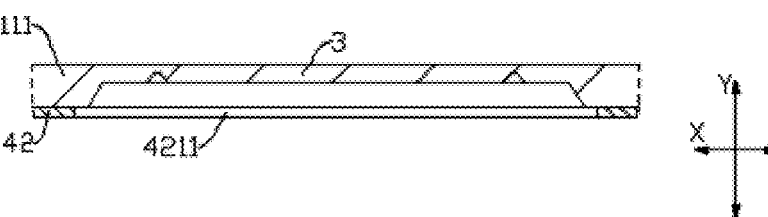
FIG. 19 is a partial enlarged view of part C of FIG. 18.

In some embodiments, referring to FIG. 17 to FIG. 19, FIG. 17 is an exploded view of a casing 11 and a first insulating member 4 provided in other embodiments of the present application; FIG. 18 is an assembly diagram of the casing 11 and the first insulating member 4 shown in FIG. 17; and FIG. 19 is a partial enlarged view of part C of FIG. 18. The casing 11 includes a first wall part 111, and the pressure relief mechanism 3 is provided on the first wall part 111. The first insulating member 4 includes a first insulating part 42 covering the outer surface of the first wall part 111, and a first pressure relief region 421 is formed in the region of the first insulating part 42 corresponding to the pressure relief mechanism 3, and the first pressure relief region 421 is configured to allow the discharge medium discharged by the pressure relief mechanism 3 to move from a side of the first insulating part 42 facing the pressure relief mechanism 3 to a side of the first insulating part 42 facing away from the pressure relief mechanism 3.

The first wall part 111 is a wall part of the casing 11 provided with the pressure relief mechanism 3, and the first insulating part 42 may be the portion of the first insulating member 4 covering the outer surface of the first wall part 111.

The first pressure relief region 421 is a region of the first insulating part 42 through which the discharge medium passes when the battery cell 10 experiences thermal runaway. The first pressure relief region 421 corresponds to the pressure relief mechanism 3, that is, projections of the first pressure relief region 421 and the pressure relief mechanism 3 in the thickness direction of the first wall part 111 at least partially overlap. In the embodiments shown in FIG. 17 to FIG. 19, the casing 11 further includes a second wall part 112, the first wall part 111 and the second wall part 112 are provided opposite to each other in the second direction Y, the first overlapping region 41 is provided on the outer surface of the second wall portion 112, and the second direction Y is the thickness direction of the first wall part 111.

The configuration of the first pressure relief region 421 can reduce the influence of the first insulating part 42 on the pressure relief mechanism 3, so that the pressure relief mechanism 3 can timely release pressure when the battery cell 10 has thermal runaway. The discharge medium inside the battery cell 10 can be quickly discharged through the pressure relief mechanism 3 and the first pressure relief region 421 in turn, which improves the timeliness of pressure relief of the battery cell 10.

In some embodiments, continuing to refer to FIG. 19, the first pressure relief region 421 includes a first through hole 4211 provided in the first insulating part 42.

The first through hole 4211 may be in various shapes. For example, the first through hole 4211 may be a round hole, a square hole, etc. The first through hole 4211 extends through the inner and outer surfaces of the first insulating part 42 in the thickness direction of the first wall part 111. There may be one or more first through holes 4211 in the first pressure relief region 421. In the embodiment shown in FIG. 19, the first insulating part 42 is provided with one first through hole 4211, and a projection of the pressure relief mechanism 3 in the thickness direction of the first wall part 111 is completely located in the first through hole 4211.

In the present embodiment, the first pressure relief region 421 has a simple structure and is easy to form. When the battery cell 10 experiences thermal runaway, the first insulating part 42 has less hindering effect on the pressure relief mechanism 3, and the discharge medium inside the battery cell 10 may be discharged more quickly through the pressure relief mechanism 3.

Figure 20:
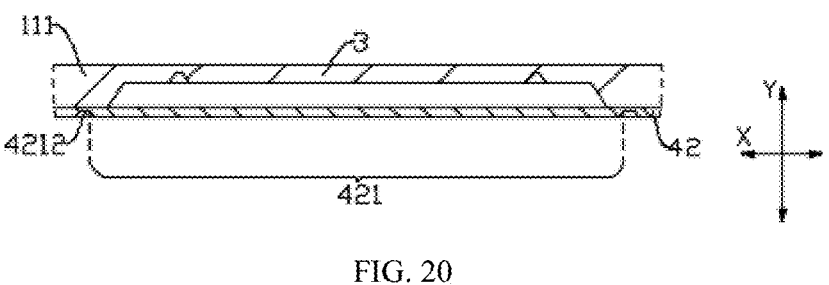
FIG. 20 is a partial enlarged view of a casing and a first insulating member, after assembling, provided in some embodiments of the present application.

In some embodiments, referring to FIG. 20, FIG. 20 is a partial enlarged view of a casing 11 and a first insulating member 4, after assembling, provided in some embodiments of the present application. The first insulating part 42 is provided with a first weak portion 4212, and the first weak portion 4212 defines the first pressure relief region 421.

The first insulating part 42 is weaker, has lower strength, and is more easily damaged, in the region where the first weak portion 4212 is provided. The first weak portion 4212 is provided along the edge of the first pressure relief region 421, and the first pressure relief region 421 is a region of the first insulating part 42 that may be opened when the battery cell 10 experiences thermal runaway.

In the present embodiment, the first insulating part 42 may cover the pressure relief mechanism 3, improving the insulation performance of the battery cell 10. The first insulating part 42 has lower strength at the position of the first weak portion 4212. When the battery cell 10 has thermal runaway, the first insulating part 42 may be cracked at the position of the first weak portion 4212, to open the first pressure relief region 421, so that the discharge medium inside the battery cell 10 may be quickly discharged.

Figure 21:
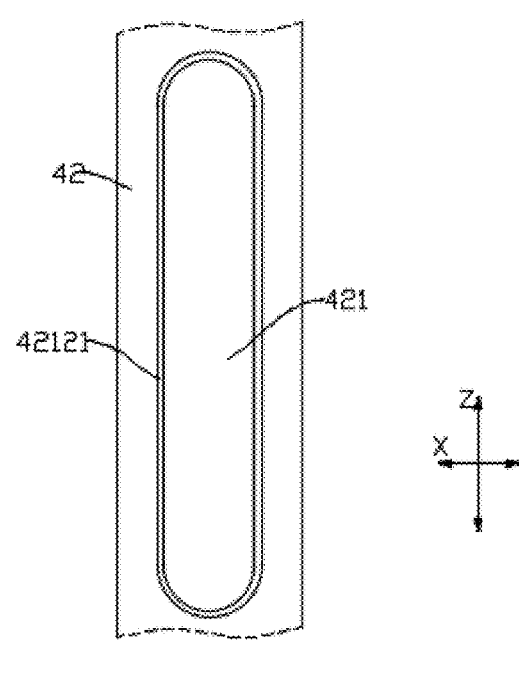
FIG. 21 is a schematic structural diagram of a first insulating part provided by some embodiments of the present application.
Figure 22:
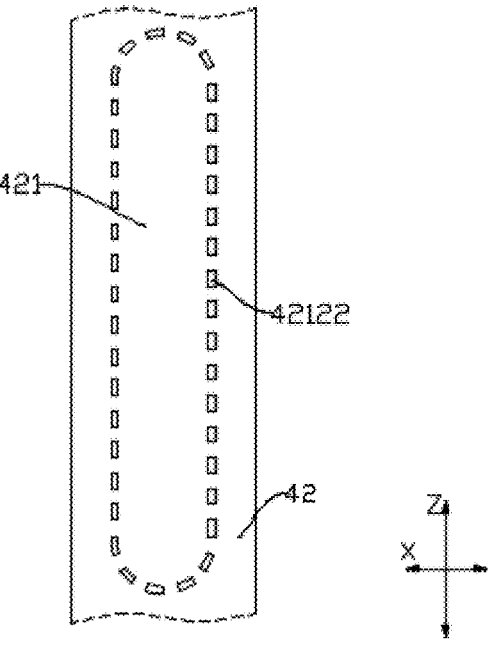
FIG. 22 is a schematic structural diagram of a first insulating part provided by other embodiments of the present application.

According to some embodiments, referring to FIG. 21 and FIG. 22, FIG. 21 is a schematic structural diagram of a first insulating part 42 provided by some embodiments of the present application; and FIG. 22 is a schematic structural diagram of a first insulating part 42 provided by other embodiments of the present application. The first weak portion 4212 includes a first linear groove 42121 and/or a first broken line 42122 provided in the first insulating part 42.

In the embodiment shown in FIG. 21, the first weak portion 4212 is a first linear groove 42121 provided on the first insulating part 42, and the first linear groove 42121 may extend in a closed trajectory to form an annular groove.

In the embodiment shown in FIG. 22, the first weak portion 4212 is a first broken line 42122 provided on the first insulating part 42, and the first broken line 42122 includes a plurality of grooves or holes arranged along a closed trajectory.

In another embodiment, a part of the first weak portion 4212 may be the first linear groove 42121, and the other part may be the first broken line 42122.

In the present embodiment, by providing the first linear groove 42121 and/or the first broken line 42122 on the first insulating part 42, the first insulating part 42 is locally weakened, and the implementation method is simple.

Figure 23:
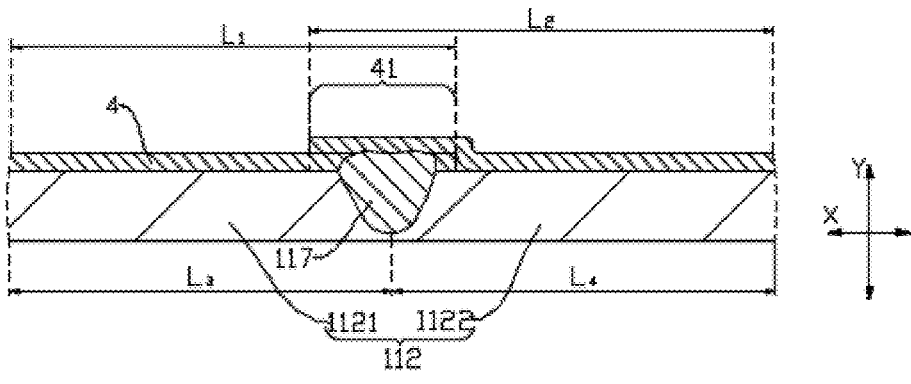
FIG. 23 is a partial enlarged view of part D of FIG. 18.

In some embodiments, referring to FIG. 23, FIG. 23 is a partial enlarged view of part D of FIG. 18. The casing 11 has an opening 116 (not shown in FIG. 23), the first insulating member 4 wraps the outer surface of the casing 11 in the circumferential direction of the opening 116, and in the circumferential direction of the opening 116, the parts of the two ends of the first insulating member 4 overlapping each other form a first overlapping region 41.

The first insulating member 4 may be formed by making a single sheet surround the casing 11 in the circumferential direction of the opening 116. The first insulating member 4 may cover outer surfaces of wall parts of the casing 11 provided in the circumferential direction of the opening 116. For example, openings 116 are formed at two opposite ends of the casing 11, and the casing 11 includes a first wall part 111, a second wall part 112, a third wall part 113 and a fourth wall part 114. In the circumferential direction of the opening 116, the first wall part 111, the third wall part 113, the second wall part 112 and the fourth wall part 114 are connected end to end in sequence. After the first insulating member 4 wraps the outer surface of the casing 11 in the circumferential direction of the opening 116, the first insulating member 4 may cover the outer surface of the first wall part 111, the outer surface of the second wall part 112, the outer surface of the third wall part 113 and the outer surface of the fourth wall part 114; for another example, an opening 116 is formed at one end of the casing 11, and the casing 11 includes a first wall part 111, a second wall part 112, a third wall part 113, a fourth wall part 114 and a fifth wall part 115. In the circumferential direction of the opening 116, the first wall part 111, the third wall part 113, the second wall part 112 and the fourth wall part 114 are connected end to end in sequence and are provided surrounding the fifth wall part 115. The casing 11 has an opening 116 formed at the end thereof opposite to the fifth wall part 115. After the first insulating member 4 wraps the outer surface of the casing 11 in the circumferential direction of the opening 116, the first insulating member 4 can cover the outer surface of the first wall part 111, the outer surface of the second wall part 112, the outer surface of the third wall part 113 and the outer surface of the fourth wall part 114. Certainly, the first insulating member 4 may also cover the outer surface of the fifth wall part 115.

The parts of the two ends of the first insulating member 4 overlapping each other form the first overlapping region 41. The part in the region of the first insulating member 4 extending by a first preset distance $L_1$ from the end face of one end in the forward direction of the circumferential direction of the opening 116 is one end of the first insulating member 4, with the length of the end being equal to the first preset distance $L_1$; the part in the region of the first insulating member 4 extending by a second preset distance $L_2$ from the end face of the other end in the reverse direction of the circumferential direction of the opening 116 is the other end of the first insulating member 4, with the length of the end being equal to the second preset distance $L_2$. The first preset distance $L_1$ may be equal to, or may be not equal to the second preset distance $L_2$. As an example, the two ends of the first insulating member 4 jointly cover the outer surface of the wall part opposite to the first wall part 111. In the embodiment shown in FIG. 23, the wall part of the casing 11 opposite to the first wall part 111 is the second wall part 112.

In the present embodiment, the first insulating member 4 wraps the outer surface of the casing 11 in the circumferential direction of the opening 116, so as to quickly cover more regions of the outer surface of the casing 11, and thereby improve the insulation performance of the battery cell 10. The first insulating member 4 wraps the outer surface of the casing 11 in the circumferential direction of the opening 116, and the two ends of the first insulating member 4 overlap each other, so as to realize that the first insulating member 4 covers the outer surface of the casing 11 and the implementation method is simple.

In some embodiments, the casing 11 has a weld mark region 117, and the first overlapping region 41 covers at least a part of the weld mark region 117.

The weld mark region 117 is a weld mark part formed by welding two parts during the molding process of the casing 11 to achieve fixed connection between the two parts. There may be one or more weld mark regions 117 on the casing 11. For example, the casing 11 is formed by bending a plate, and the two ends of the plate are welded to each other, so that one weld mark region 117 is formed on the casing 11; and for another example, the casing 11 is formed by splicing a plurality of plate bodies, and two adjacent plates are welded to each other to form a weld mark region 117 at the welding position of the two adjacent plate bodies, so that a plurality of weld mark regions 117 are formed on the casing 11. The first overlapping regions 41 may correspond to the weld mark regions 117 on the casing 11 one by one, and one overlapping region correspondingly covers one weld mark region 117; or one overlapping region may correspond to multiple weld mark regions 117, and one overlapping region covers the multiple weld mark regions 117. The first overlapping region 41 may cover a part of the weld mark region 117, or may cover the entire weld mark region 117.

When the casing 11 is welded to form the weld mark region 117, the weld mark region 117 is likely to form welding slag(s) protruding from the outer surface of the casing 11, and the welding slag(s) is likely to pierce the first insulating member 4, causing insulation failure of the battery cell 10. Since the first overlapping region 41 is a thicker region of the first insulating member 4, the first overlapping region 41 covers at least a part of the weld mark region 117, reducing the risk of the weld mark region 117 piercing the first insulating member 4 and causing insulation failure of the battery cell 10, thereby improving the insulation performance of the battery cell 10.

In some embodiments, the first overlapping region 41 covers all of the weld mark region 117.

The first overlapping region 41 covers the entire weld mark region 117, so that the projection of the weld mark region 117 in the wall thickness direction of the casing 11 is completely located in the first overlapping region 41, thereby increasing the overlapping region of the first overlapping region 41 and the weld mark region 117, and further reducing the risk of the weld mark region 117 piercing the first insulating member 4.

In some embodiments, continuing to refer to FIG. 23, the casing 11 is formed by bending a plate, and two ends of the plate are connected by welding to form the weld mark region 117.

Before the casing 11 is formed, the plate may be of a flat plate structure, and the casing 11 is formed by bending the plate and welding two ends of the plate to each other. The two ends of the plate are respectively a first end 1121 and a second end 1122. The part in the region of the plate extending by a third preset distance $L_3$ from the end face of one end in the forward direction of the circumferential direction of the opening 116 of the casing 111 is the first end 1121, with the length of the first end 1121 being equal to the third preset distance $L_3$; and the part in the region of the plate extending by a fourth preset distance $L_4$ from the end face of the other end in the reverse direction of the circumferential direction of the opening 116 of the casing 11 is the second end 1122, with the length of the second end 1122 being equal to the fourth preset distance $L_4$. The third preset distance $L_3$ may be equal to or not equal to the fourth preset distance $L_4$. As an example, the first end 1121 and the second end 1122 together form the wall part opposite to the first wall part 111.

When forming the casing 11, it needs only to bend the plate and weld the two ends of the plate. The casing 11 has simple forming method and is easier to form than traditional casings 11 formed by stamping or stretching. It can effectively reduce the forming difficulty and the forming efficiency of the casing 11, and the yield rate of finished products are higher, especially for the thin-wall casing, the thin-wall casing having a thickness of not greater than 0.6 mm.

Figures 24, 25:
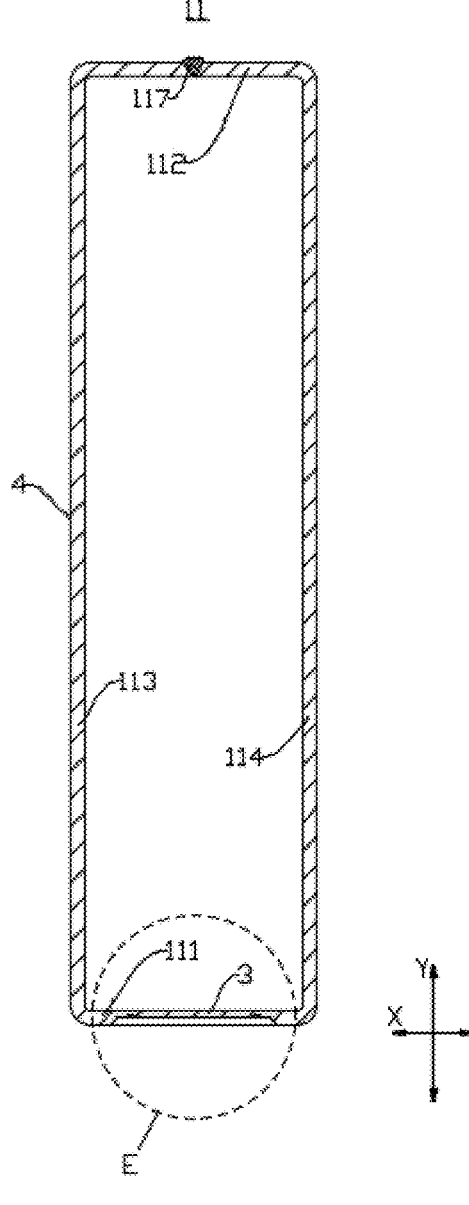
FIG. 24 is a schematic structural diagram of the casing shown in FIG. 18.
FIG. 25 is a partial enlarged view of part E of FIG. 24.

In some embodiments, referring to FIG. 24 and FIG. 25, FIG. 24 is a schematic structural diagram of the casing 11 shown in FIG. 18; and FIG. 25 is a partial enlarged view of part E of FIG. 24. The casing 11 includes a first wall part 111, and the pressure relief mechanism 3 is provided on the first wall part 111. The pressure relief mechanism 3 is integrally formed with the first wall part 111.

As an example, the first wall part 111 is provided with a groove 1111, and the groove bottom wall of the groove 1111 forms the pressure relief mechanism 3. The groove 1111 may be provided on the inner surface and/or the outer surface of the first wall part 111. In the embodiments shown in FIG. 24 and FIG. 25, the groove 1111 is provided on the outer surface of the first wall part 111, and the portion between the groove bottom surface of the groove 1111 and the inner surface of the first wall part 111 is the groove bottom wall of the groove 1111.

The groove 1111 may be formed on the first wall part 111 in various ways, such as stamping, milling, laser etching, etc. The groove 1111 may be in various shapes. For example, the groove 1111 may be a rectangular groove, circular groove, elliptical groove, etc. The rectangular groove is a groove with a rectangular cross section, the circular groove is a groove with a circular cross section, and the elliptical groove is a groove with an elliptical cross section. The cross section referred to here is perpendicular to the depth direction of the groove 1111.

As an example, in order to improve the pressure relief sensitivity of the pressure relief mechanism 3, a score groove 31 may be provided on the pressure relief mechanism 3. When the internal pressure of the battery cell 10 reaches a threshold value, the pressure relief mechanism 3 breaks along the score groove 31 to release the pressure, so as to release the pressure inside the battery cell 10 in time. The score groove 31 may be formed in various ways, such as stamping, milling, laser etching, etc. The score groove 31 may be a groove extending along a closed trajectory, such as an annular groove; the score groove 31 may also be a groove extending along a non-closed trajectory, such as a linear groove, an arc-shaped groove, a U-shaped groove, etc.

In the present embodiment, the pressure relief mechanism 3 is integrally formed with the first wall part 111, the reliability of the pressure relief mechanism 3 is higher, the process of connecting the pressure relief mechanism 3 and the first wall part 111 is omitted, and the production cost of the battery cell 10 can be reduced.

Figure 26:
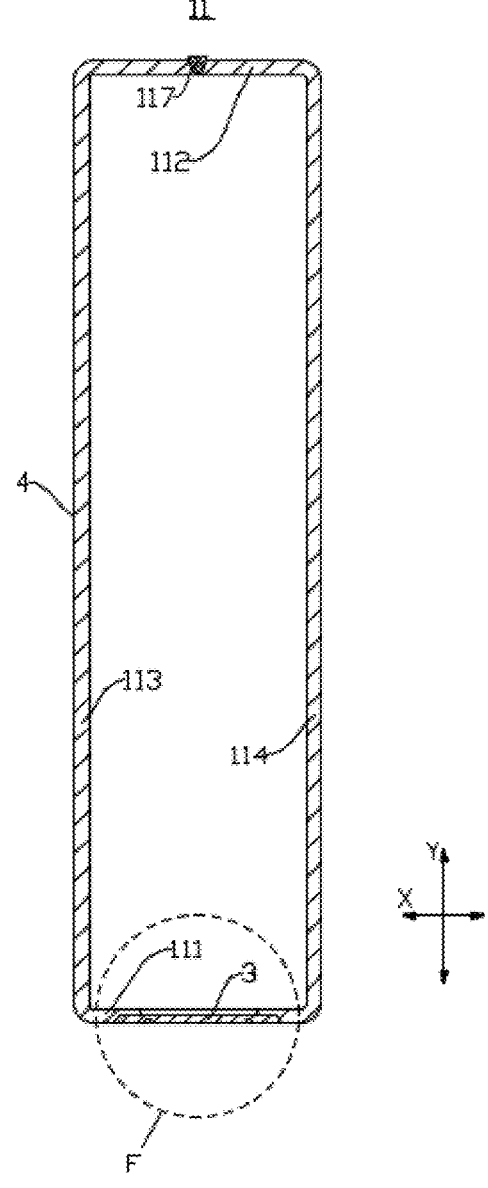
FIG. 26 is a schematic structural diagram of a casing provided by other embodiments of the present application.
Figure 27:
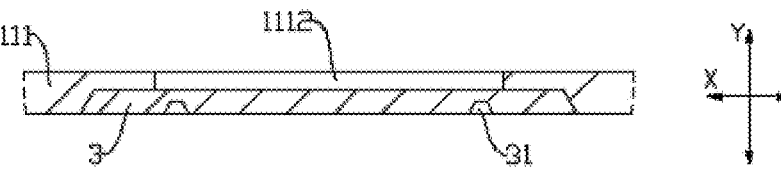
FIG. 27 is a partial enlarged view of part F of FIG. 26.

In some embodiments, referring to FIG. 26 and FIG. 27, FIG. 26 is a schematic structural diagram of a casing 11 provided by other embodiments of the present application; and FIG. 27 is a partial enlarged view of part F of FIG. 26. The casing 11 includes a first wall part 111, and the pressure relief mechanism 3 is arranged on the first wall part 111; the pressure relief mechanism 3 and the first wall part 111 are separately arranged, and the pressure relief mechanism 3 is installed on the first wall part 111.

The pressure relief mechanism 3 and the casing 11 are two separate components, which are separately molded and then installed together. The pressure relief mechanism 3 may be a component such as an explosion-proof disc, an explosion-proof valve, or a safety valve. The pressure relief mechanism 3 may be installed on the first wall part 111 by bonding, welding or the like. The first wall part 111 is provided with a pressure relief hole 1112, and the pressure relief mechanism 3 covers the pressure relief hole 1112. When the pressure inside the battery cell 10 reaches a threshold value, the pressure relief mechanism 3 opens at least a part of the pressure relief hole 1112, and the discharge medium inside the battery cell 10 is discharged through the pressure relief hole 1112 to release the pressure inside the battery cell 10.

As an example, in order to improve the pressure relief sensitivity of the pressure relief mechanism 3, a score groove 31 may be provided on the pressure relief mechanism 3. When the internal pressure of the battery cell 10 reaches a threshold value, the pressure relief mechanism 3 breaks along the score groove 31 to release the pressure, so as to release the pressure inside the battery cell 10 in time. The score groove 31 may be formed in various ways, such as stamping, milling, laser etching, etc. The score groove 31 may be a groove extending along a closed trajectory, such as an annular groove; the score groove 31 may also be a groove extending along a non-closed trajectory, such as a linear groove, an arc-shaped groove, a U-shaped groove, etc.

In the present embodiment, the pressure relief mechanism 3 and the first wall part 111 are separately provided, the pressure relief mechanism 3 is a component independent of the casing 11, and the pressure relief mechanism 3 and the casing 11 may be produced and assembled separately, with low production difficulty and high efficiency.

Figure 28:
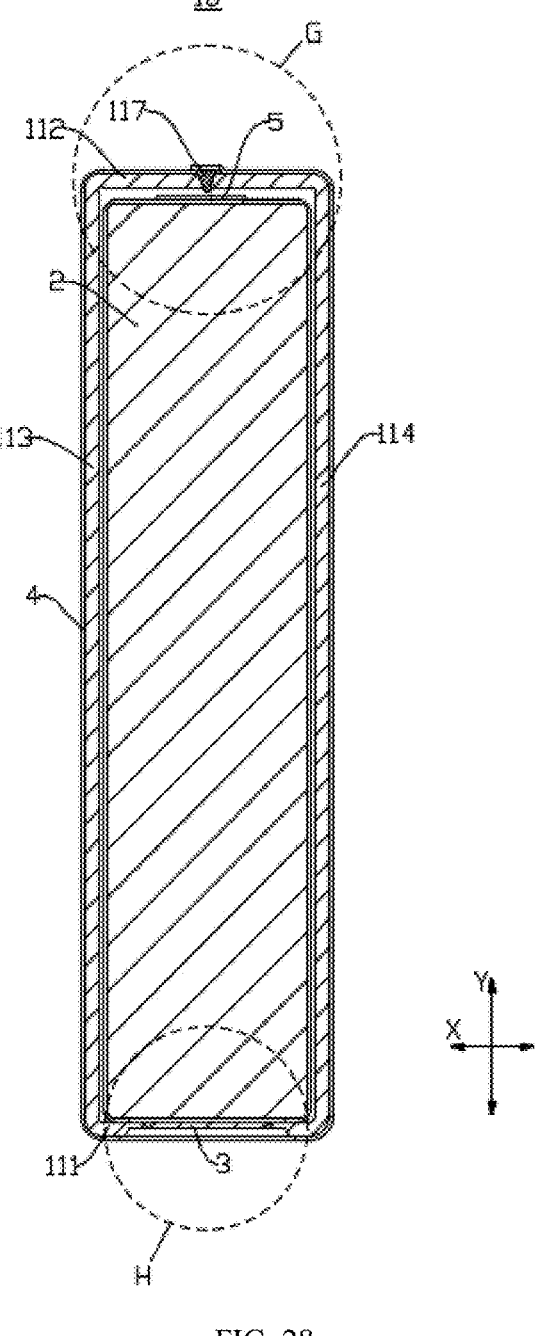
FIG. 28 is an assembly diagram of a battery cell provided by some embodiments of the present application.
Figure 29:
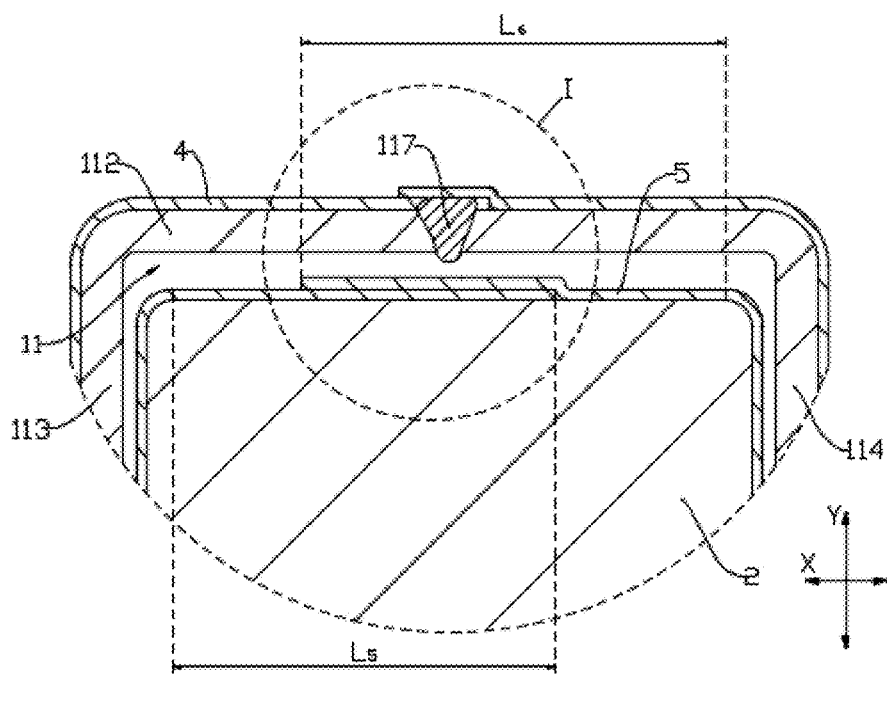
FIG. 29 is a partial enlarged view of part G of FIG. 28.
Figure 30:
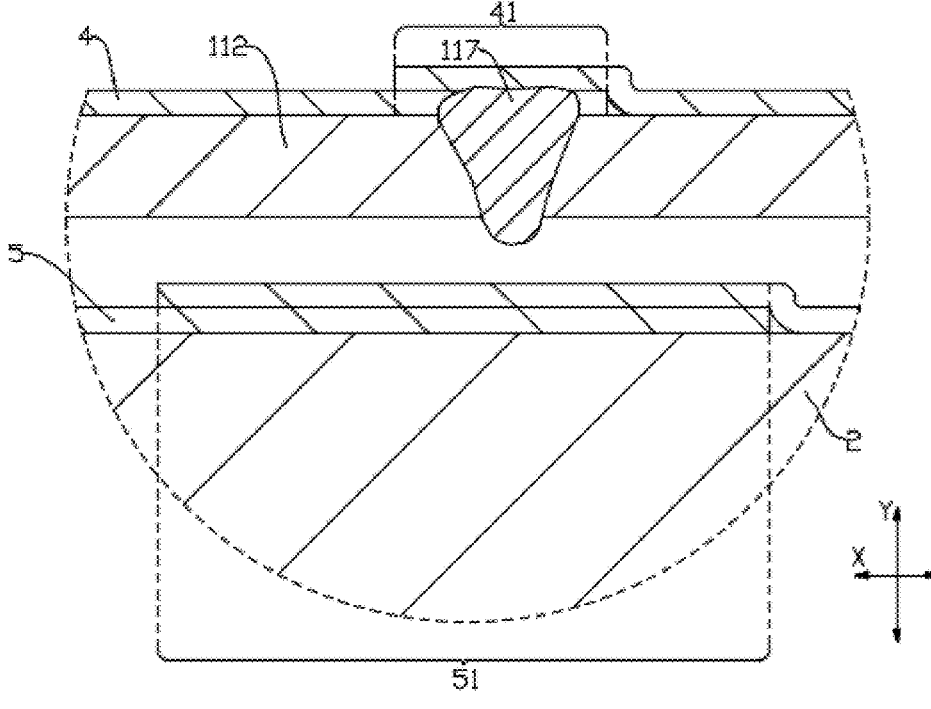
FIG. 30 is a partial enlarged view of part I of FIG. 29.

In some embodiments, referring to FIG. 28 to FIG. 30, FIG. 28 is an assembly diagram of a battery cell 10 provided by some embodiments of the present application; FIG. 29 is a partial enlarged view of part G of FIG. 28; and FIG. 30 is a partial enlarged view of part I of FIG. 29. The battery cell 10 further includes an electrode assembly 2 and a second insulating member 5. The electrode assembly 2 is at least partially provided in the casing 11. The second insulating member 5 is provided between the electrode assembly 2 and the casing 11, and the second insulating member 5 is configured to insulate and isolate the electrode assembly 2 from the casing 11. In the above, the second insulating member 5 has a second overlapping region 51, and the second overlapping region 51 does not overlap with the pressure relief mechanism 3.

The second insulating member 5 is an insulating component provided between the electrode assembly 2 and the casing 11, and is made of an insulating material which may be rubber, plastic, etc.

The second overlapping region 51 is a part formed by stacking at least two portions of the second insulating member 5 together, and the thickness of the second overlapping region 51 is larger than the thicknesses of other portions of the second insulating member 5. The second overlapping region 51 may be of a multi-layer structure formed by stacking a plurality of portions of the second insulating member 5 after wrapping the outer surface of the electrode assembly 2. The second overlapping region 51 may be in a two-layer structure, a three-layer structure, a four-layer structure, a five-layer structure, etc. There may be one or more second overlapping regions 5 on the second insulating member 4.

The second overlapping region 51 does not overlap with the pressure relief mechanism 3. It is understandable that the second overlapping region 51 does not cover the pressure relief mechanism 3, and the second overlapping region 51 does not block the pressure relief mechanism 3. The second overlapping region 51 and the pressure relief mechanism 3 may be provided corresponding to the same wall part of the casing 11, or the second overlapping region 51 and the pressure relief mechanism 3 may be provided corresponding to two wall parts of the casing 11, respectively.

The second insulating member 5 is located between the electrode assembly 2 and the casing 11, and serves to separate the electrode assembly 2 from the casing 11 to achieve insulation between the electrode assembly 2 and the casing 11. The second overlapping region 51 does not overlap with the pressure relief mechanism 3, so that the second overlapping region 51 of the second insulating member 5 does not block the pressure relief mechanism 3, reducing the impact of the second overlapping region 51 on the pressure relief mechanism 3 and improving the timeliness of pressure relief of the pressure relief mechanism 3.

In some embodiments, continuing to refer to FIG. 28 to FIG. 30, the casing 11 includes a first wall part 111 and a second wall part 112, the pressure relief mechanism 3 is provided on the first wall part 111, and the second overlapping region 51 is provided on an inner side of the second wall part 112, and located between the second wall part 112 and the electrode assembly 2.

The first wall part 111 and the second wall part 112 may be two adjacent wall parts of the casing 11. The first wall part 111 and the second wall part 112 may be two opposite wall parts of the casing 11. In the embodiments shown in FIG. 28 to FIG. 30, the first wall part 111 and the second wall part 112 are provided opposite to each other.

As an example, the second wall part 112 has a weld mark region 117, and the second overlapping region 51 is provided corresponding to the weld mark region 117, and the second overlapping region 51 covers at least a part of the weld mark region 117. It is understandable that the second overlapping region 51 may cover all of the weld mark region 117, or may cover a part of the weld mark region 117. Since the second overlapping region 51 is a thicker region of the second insulating member 5, and the second overlapping region 51 covers at least a part of the weld mark region 117, reducing the risk of the weld mark region 117 piercing the second insulating member 5 and causing insulation failure of the casing 11 and the electrode assembly 2.

In the present embodiment, the pressure relief mechanism 3 and the overlapping region 51 are provided corresponding to the two wall parts of the casing 11 respectively, further reducing the influence of the second overlapping region 51 on the pressure relief mechanism 3. In the embodiment in which the third wall part 113 and the fourth wall part 114 in the casing 11 are arranged opposite to each other in the thickness direction of the battery cell 10, the second overlapping region 51 is not located in the thickness direction of the battery cell 10, and the second overlapping region 51 does not occupy the expansion space between the electrode assembly 2 and the third wall part 113 or the fourth wall part 114, and can provide more expansion space for the electrode assembly 2.

In some embodiments, continuing to refer to FIG. 28 to FIG. 30, the casing 11 has an opening 116 (not shown in FIG. 28 to FIG. 30), the second insulating member 5 wraps the outer surface of the electrode assembly 2 in the circumferential direction of the opening 116, and in the circumferential direction of the opening 116, the parts of the two ends of the second insulating member 5 overlapping each other form a second overlapping region 51.

The second insulating member 5 may be formed by making a single sheet surround the electrode assembly 2 in the circumferential direction of the opening 116. In some embodiments, openings 116 are formed at two opposite ends of the casing 11, and the casing 11 includes a first wall part 111, a second wall part 112, a third wall part 113 and a fourth wall part 114. In the circumferential direction of the opening 116, the first wall part 111, the third wall part 113, the second wall part 112 and the fourth wall part 114 are connected end to end in sequence. After the second insulating member 5 wraps the outer surface of the electrode assembly 2 in the circumferential direction of the opening 116, the second insulating member 5 can cover the outer surface of the electrode assembly 2 facing the first wall part 111, the third wall part 113, the second wall part 112 and the fourth wall part 114. In other embodiments, an opening 116 is formed at one end of the casing 11, and the casing 11 includes a first wall part 111, a second wall part 112, a third wall part 113, a fourth wall part 114 and a fifth wall part 115. In the circumferential direction of the opening 116, the first wall part 111, the third wall part 113, the second wall part 112 and the fourth wall part 114 are connected end to end in sequence and are provided surrounding the fifth wall part 115. The casing 11 has an opening 116 formed at the end thereof opposite to the fifth wall part 115. After the second insulating member 5 wraps the outer surface of the electrode assembly 2 in the circumferential direction of the opening 116, the second insulating member 5 may cover the outer surface of the electrode assembly 2 facing the first wall part 111, the third wall part 113, the second wall part 112 and the fourth wall part 114. Certainly, the second insulating member 5 may also cover the outer surface of the electrode assembly 2 facing the fifth wall part 115.

The parts of the two ends of the second insulating member 5 overlapping each other form the second overlapping region 51. The part in the region of the second insulating member 5 extending by a fifth preset distance $L_5$ from the end face of one end in the forward direction of the circumferential direction of the opening 116 is one end of the second insulating member 5, with the length of the end being equal to the fifth preset distance $L_5$; and the part in the region of the second insulating member 5 extending by a sixth preset distance $L_6$ from the end face of the other end in the reverse direction of the circumferential direction of the opening 116 is the other end of the second insulating member 5, with the length of the end being equal to the sixth preset distance $L_6$. The fifth preset distance $L_5$ may be equal to, or may be not equal to the sixth preset distance $L_6$. As an example, two ends of the second insulating member 5 together cover the outer surface of the electrode assembly 2 facing the second wall part 112.

The second insulating member 5 wraps the outer surface of the electrode assembly 2 in the circumferential direction of the opening 116, so as to quickly cover more regions of the outer surface of the electrode assembly 2, and thereby improve the insulation performance between the electrode assembly 2 and the casing 11. The second insulating member 5 wraps the outer surface of the electrode assembly 2 in the circumferential direction of the opening 116, and the two ends of the second insulating member 5 overlap each other, so as to realize that the second insulating member 5 covers the outer surface of the electrode assembly 2 and the implementation method is simple.

Figure 31:
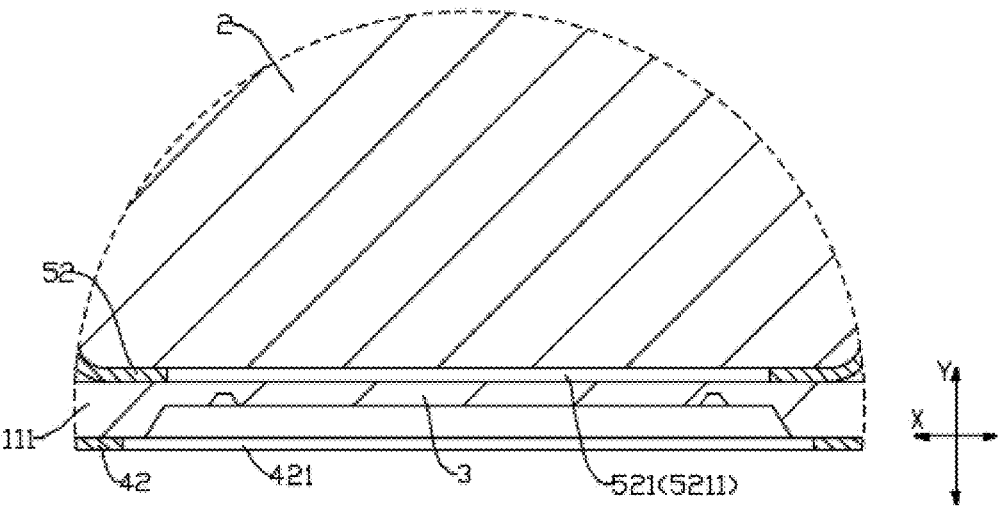
FIG. 31 is a partial enlarged view of part H of FIG. 28.

In some embodiments, referring to FIG. 31, FIG. 31 is a partial enlarged view of part H of FIG. 28. The casing 11 includes a first wall part 111, and the pressure relief mechanism 3 is provided on the first wall part 111. The second insulating member 5 includes a second insulating part 52 located between the first wall part 111 and the electrode assembly 2, and a second pressure relief region 521 is formed in the region of the second insulating part 52 corresponding to the pressure relief mechanism 3, and the second pressure relief region 521 is configured to allow the discharge medium inside the battery cell 10 to move from one side of the second insulating part 52 away from the pressure relief mechanism 3 to one side of the second insulating part 52 facing the pressure relief mechanism 3.

The second insulating part 52 is a part of the second insulating member 5 located between the electrode assembly 2 and the first wall part 111. The second pressure relief region 521 is a region of the second insulating part 52 through which the discharge medium passes when the battery cell 10 experiences thermal runaway. The second insulating part 52 is corresponding to the pressure relief mechanism 3, that is, projections of the second pressure relief region 521 and the pressure relief mechanism 3 in the thickness direction of the first wall part 111 at least partially overlap. As an example, the first wall part 111 and the second wall part 112 (not shown in FIG. 28) are provided corresponding to each other in the second direction Y, and the second direction Y is the thickness direction of the first wall part 111.

The arrangement of the second pressure relief region 521 may reduce the hindering effect of the second insulating part 52 on the discharge medium, so that the discharge medium generated by the electrode assembly 2 can quickly reach the pressure relief mechanism 3 through the second pressure relief region 521, shortening the path of the discharge medium generated by the electrode assembly 2 moving to the pressure relief mechanism 3, and improving the timeliness of the pressure relief of the battery cell 10.

In some embodiments, continuing to refer to FIG. 31, the second pressure relief region 521 includes a second through hole 5211 provided in the second insulating part 52.

The second through hole 5211 may be in various shapes. For example, the second through hole 5211 may be a round hole, a square hole, etc. The second through hole 5211 extends through the inner and outer surfaces of the second insulating part 52 in the thickness direction of the first wall part 111. There may be one or more second through holes 5211 in the second pressure relief region 521. In the embodiment shown in FIG. 31, the second insulating part 52 is provided with one second through hole 5211, and a projection of the pressure relief mechanism 3 in the thickness direction of the second wall part 112 is completely located in the second through hole 5211.

In the present embodiment, the second pressure relief region 521 has a simple structure and is easy to form. When the battery cell 10 experiences thermal runaway, the discharge medium generated by the electrode assembly 2 may more quickly pass through the second through hole 5211 and reach the pressure relief mechanism 3.

Figure 32:
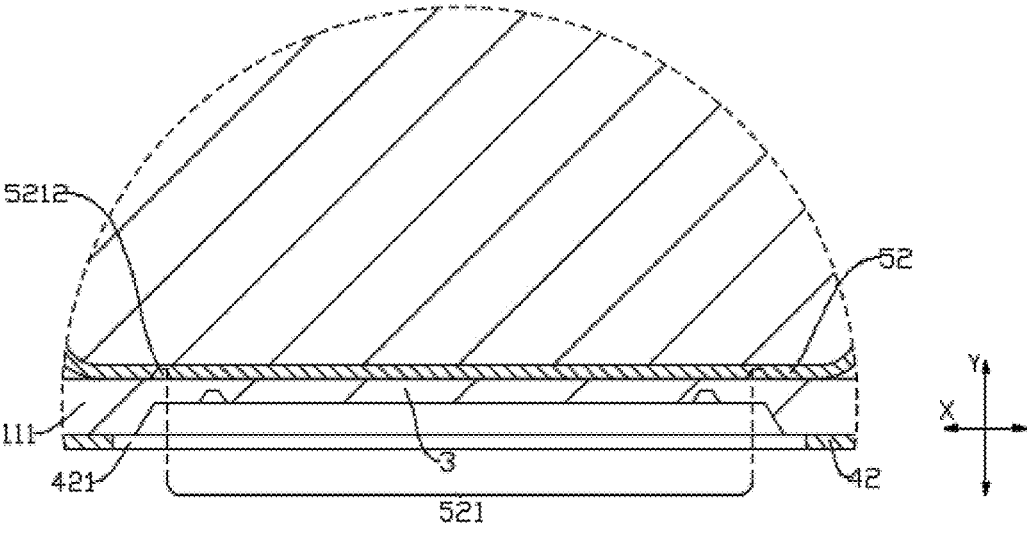
FIG. 32 is a partial enlarged view of a battery cell provided by other embodiments of the present application.

In some embodiments, referring to FIG. 32, FIG. 32 is a partial enlarged view of a battery cell 10 provided by other embodiments of the present application. The second insulating part 52 is provided with a second weak portion 5212, and the second weak portion 5212 defines the second pressure relief region 521.

The second insulating part 52 is weaker, has lower strength, and is more easily damaged, in the region where the second weak portion 5212 is provided. The second weak portion 5212 is provided along the edge of the second pressure relief region 521, and the second pressure relief region 521 is a region of the second insulating part 52 that may be opened when the battery cell 10 experiences thermal runaway.

During normal use of the battery cell 10, the second pressure relief region 521 is not opened, and the second insulating member 5 may play a better insulating effect between the electrode assembly 2 and the casing 11. The second insulating part 52 has lower strength at the position of the second weak portion 5212. When the battery cell 10 has thermal runaway, the second insulating part 52 may be cracked at the position of the second weak portion 5212 to open the second pressure relief region 521, so that the discharge medium generated by the electrode assembly 2 may quickly pass through the second insulating part 52 and reach the pressure relief mechanism 3.

Figure 33:
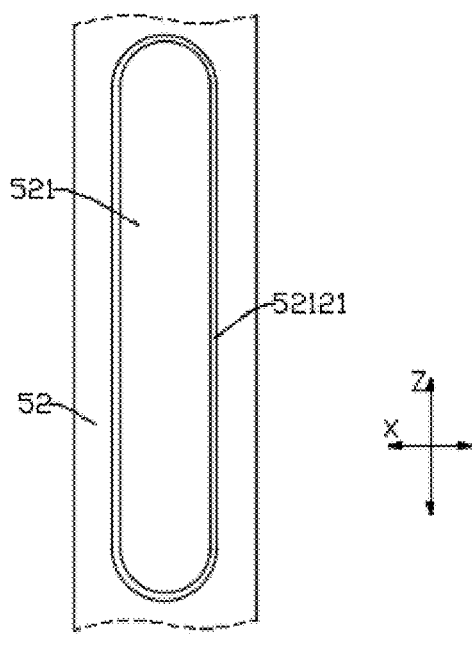
FIG. 33 is a schematic structural diagram of a second insulating part provided by some embodiments of the present application.
Figure 34:
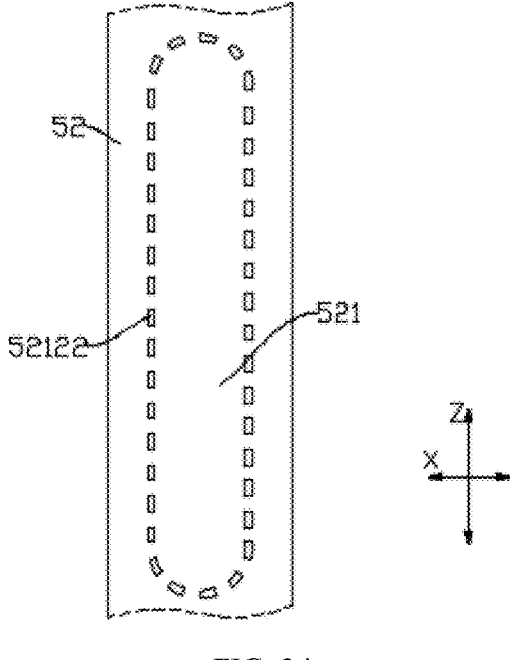
FIG. 34 is a schematic structural diagram of a second insulating part provided by other embodiments of the present application.

In some embodiments, referring to FIG. 33 and FIG. 34, FIG. 33 is a schematic structural diagram of a second insulating part 52 provided by some embodiments of the present application; and FIG. 34 is a schematic structural diagram of a second insulating part 52 provided by other embodiments of the present application. The second weak portion 5212 includes a second linear groove 52121 and/or a second broken line 52122 provided in the second insulating part 52.

In the embodiment shown in FIG. 33, the second weak portion 5212 is a second linear groove 52121 provided on the second insulating part 52, and the second linear groove 52121 may extend in a closed trajectory to form an annular groove.

In the embodiment shown in FIG. 34, the second weak portion 5212 is a second broken line 52122 provided on the second insulating part 52, and the second broken line 52122 includes a plurality of grooves or holes arranged along a closed trajectory.

In another embodiment, a part of the second weak portion 5212 may be the second linear groove 52121, and the other part may be the second broken line 52122.

In the present embodiment, by providing the second linear groove 52121 and/or the second broken line 52122 on the second insulating part 52, the second insulating part 52 is locally weakened, and the implementation method is simple.

Embodiments of the present application further provide a battery 100, including at least one battery cell 10 provided by any of the embodiments above.

Embodiments of the present application provide an electric device, including at least one battery cell 10 provided in any of the embodiments above.

Referring to FIG. 3 to FIG. 9, embodiments of the present application provide a battery cell 10. The battery cell 10 includes a shell 1, an electrode assembly 2, a pressure relief mechanism 3, a first insulating member 4 and a second insulating member 5. The shell 1 includes a casing 11 and end covers 12, the casing 11 has openings 116, the end covers 12 correspond to the openings 116 one by one, and the end covers 12 seal the openings 116 of the casing 11. The casing 11 includes a first wall part 111, a second wall part 112, a third wall part 113 and a fourth wall part 114. In the circumferential direction of the opening 116, the first wall part 111, the third wall part 113, the second wall part 112 and the fourth wall part 114 are connected end to end in sequence. The third wall part 113 and the fourth wall part 114 are provided opposite to each other in the first direction X. The first wall part 111 and the second wall part 112 are arranged opposite to each other in the second direction Y. In the third direction Z, openings 116 are formed at two opposite ends of the casing 11. The first direction X is the thickness direction of the battery cell 10. Any two of the first direction X, the second direction Y and the third direction Z are perpendicular to each other. The first insulating member 4 may wrap the outer surface of the casing 11, to cover the outer surface of the first wall part 111, the outer surface of the second wall part 112, the outer surface of the third wall part 113, and the outer surface of the fourth wall part 114. The electrode assembly 2 is accommodated in the casing 11. In the third direction Z, tabs 21 with opposite polarities are formed at the two opposite ends of the electrode assembly 2. Electrode terminals 6 are provided on the end covers 12. The electrode terminals 6 on the two end covers 12 are electrically connected to the tabs 21 at the two ends of the electrode assembly 2 respectively. The pressure relief mechanism 3 is provided on the first wall part 111. The first insulating member 4 has a first overlapping region 41. The first overlapping region 41 is provided on the outer surface of the second wall part 112, so that the first overlapping region 41 does not overlap with the pressure relief mechanism 3. The second insulating member 5 is provided between the electrode assembly 2 and the casing 11, and the second insulating member 5 is configured to insulate and isolate the electrode assembly 2 from the casing 11. The second insulating member 5 has a second overlapping region 51. The second overlapping region 51 is provided on the inner side of the second wall part 112, and located between the second wall part 112 and the electrode assembly 2, so that the second overlapping region 51 does not overlap with the pressure relief mechanism 3.

In the above, the first insulating member 4 includes a first insulating part 42 covering the outer surface of the first wall part 111, and a first pressure relief region 421 is formed in the region of the first insulating part 42 corresponding to the pressure relief mechanism 3, and the first pressure relief region 421 is configured to allow the discharge medium discharged by the pressure relief mechanism 3 to move from a side of the first insulating part 42 facing the pressure relief mechanism 3 to a side of the first insulating part 42 facing away from the pressure relief mechanism 3. The first pressure relief region 421 may include a first through hole 4211 provided on the first insulating part 42; the first pressure relief region 421 may also be a region defined by a first weak portion 4212 on the first insulating part 42, and the first weak portion 4212 may include a first linear groove 42121 and/or a first broken line 42122 provided on the first insulating part 42.

The second insulating member 5 includes a second insulating part 52 located between the first wall part 111 and the electrode assembly 2, and a second pressure relief region 521 is formed in the region of the second insulating part 52 corresponding to the pressure relief mechanism 3, and the second pressure relief region 521 is configured to allow the discharge medium inside the battery cell 10 to move from one side of the second insulating part 52 away from the pressure relief mechanism 3 to one side of the second insulating part 52 facing the pressure relief mechanism 3. The second pressure relief region 521 may include a second through hole provided on the second insulating part 52; the second pressure relief region 521 may also be a region defined by a second weak portion 5212 on the second insulating part 52, and the second weak portion 5212 may include a second linear groove 52121 and/or a second broken line 52122 provided on the second insulating part 52.

Referring to FIG. 10 to FIG. 11, embodiments of the present application provide a battery cell 10. The battery cell 10 includes a shell 1, an electrode assembly 2, a pressure relief mechanism 3, a first insulating member 4 and a second insulating member 5. The shell 1 includes a casing 11 and an end cover 12, the casing 11 has an opening 116, the end cover 12 corresponds to the opening 116 one by one, and the end cover 12 seals the opening 116 of the casing 11. The casing 11 includes a first wall part 111, a second wall part 112, a third wall part 113, a fourth wall part 114 and a fifth wall part 115. In the circumferential direction of the opening 116, the first wall part 111, the third wall part 113, the second wall part 112 and the fourth wall part 114 are connected end to end in sequence and are provided surrounding the fifth wall part 115. The third wall part 113 and the fourth wall part 114 are provided opposite to each other in the first direction X. The first wall part 111 and the second wall part 112 are arranged opposite to each other in the second direction Y. In the third direction Z, the fifth wall part 115 is provided opposite to the opening 116. The first direction X is the thickness direction of the battery cell 10. Any two of the first direction X, the second direction Y and the third direction Z are perpendicular to each other. The first insulating member 4 wraps the outer surface of the casing 11, to cover the outer surface of the first wall part 111, the outer surface of the second wall part 112, the outer surface of the third wall part 113, and the outer surface of the fourth wall part 114. The electrode assembly 2 is accommodated in the casing 11. In the third direction Z, two tabs 21 with opposite polarities are formed at one end of the electrode assembly 2. Two electrode terminals 6 are provided on the end cover 12. The two electrode terminals 6 are electrically connected to the two tabs 21, respectively. The pressure relief mechanism 3 is provided on the first wall part 111. The first insulating member 4 has a first overlapping region 41. The first overlapping region 41 is provided on the outer surface of the second wall part 112, so that the first overlapping region 41 does not overlap with the pressure relief mechanism 3. The second insulating member 5 is provided between the electrode assembly 2 and the casing 11, and the second insulating member 5 is configured to insulate and isolate the electrode assembly 2 from the casing 11. The second insulating member 5 has a second overlapping region 51. The second overlapping region 51 is provided on the inner side of the second wall part 112, and located between the second wall part 112 and the electrode assembly 2, so that the second overlapping region 51 does not overlap with the pressure relief mechanism 3.

In the above, the first insulating member 4 includes a first insulating part 42 covering the outer surface of the first wall part 111, and a first pressure relief region 421 is formed in the region of the first insulating part 42 corresponding to the pressure relief mechanism 3, and the first pressure relief region 421 is configured to allow the discharge medium discharged by the pressure relief mechanism 3 to move from a side of the first insulating part 42 facing the pressure relief mechanism 3 to a side of the first insulating part 42 facing away from the pressure relief mechanism 3. The first pressure relief region 421 may include a first through hole 4211 provided on the first insulating part 42; the first pressure relief region 421 may also be a region defined by a first weak portion 4212 on the first insulating part 42, and the first weak portion 4212 may include a first linear groove 42121 and/or a first broken line 42122 provided on the first insulating part 42.

The second insulating member 5 includes a second insulating part 52 located between the first wall part 111 and the electrode assembly 2, and a second pressure relief region 521 is formed in the region of the second insulating part 52 corresponding to the pressure relief mechanism 3, and the second pressure relief region 521 is configured to allow the discharge medium inside the battery cell 10 to move from one side of the second insulating part 52 away from the pressure relief mechanism 3 to one side of the second insulating part 52 facing the pressure relief mechanism 3. The second pressure relief region 521 may include a second through hole provided on the second insulating part 52; the second pressure relief region 521 may also be a region defined by a second weak portion 5212 on the second insulating part 52, and the second weak portion 5212 may include a second linear groove 52121 and/or a second broken line 52122 provided on the second insulating part 52.

Referring to FIG. 12 to FIG. 14, embodiments of the present application provide a battery cell 10. The battery cell 10 includes a shell 1, an electrode assembly 2, a pressure relief mechanism 3, a first insulating member 4 and a second insulating member 5. The shell 1 includes a casing 11 and an end cover 12, the casing 11 has an opening 116, the end cover 12 corresponds to the opening 116 one by one, and the end cover 12 seals the opening 116 of the casing 11. The casing 11 includes a first wall part 111, a second wall part 112, a third wall part 113, a fourth wall part 114 and a fifth wall part 115. In the circumferential direction of the opening 116, the second wall part 112, the third wall part 113, the fifth wall part 115 and the fourth wall part 114 are connected end to end in sequence and are provided surrounding the first wall part 111. The third wall part 113 and the fourth wall part 114 are provided opposite to each other in the first direction X. The second wall part 112 and the fifth wall part 115 are arranged opposite to each other in the second direction Y. In the third direction Z, the first wall part 111 is provided opposite to the opening 116. The first direction X is the thickness direction of the battery cell 10. Any two of the first direction X, the second direction Y and the third direction Z are perpendicular to each other. The first insulating member 4 may wrap the outer surface of the casing 11, to cover the outer surface of the first wall part 111, the outer surface of the second wall part 112, the outer surface of the third wall part 113, the outer surface of the fourth wall part 114, and the outer surface of the fifth wall part 115. The electrode assembly 2 is accommodated in the casing 11. In the third direction Z, two tabs 21 with opposite polarities are formed at one end of the electrode assembly 2. Two electrode terminals 6 are provided on the end cover 12. The two electrode terminals 6 are electrically connected to the two tabs 21, respectively. The pressure relief mechanism 3 is provided on the first wall part 111. The first insulating member 4 has a first overlapping region 41. The first overlapping region 41 is provided on the outer surface of the second wall part 112, so that the first overlapping region 41 does not overlap with the pressure relief mechanism 3. The second insulating member 5 is provided between the electrode assembly 2 and the casing 11, and the second insulating member 5 is configured to insulate and isolate the electrode assembly 2 from the casing 11. The second insulating member 5 has a second overlapping region 51. The second overlapping region 51 is provided on the inner side of the second wall part 112, and located between the second wall part 112 and the electrode assembly 2, so that the second overlapping region 51 does not overlap with the pressure relief mechanism 3.

In the above, the first insulating member 4 includes a first insulating part 42 covering the outer surface of the first wall part 111, and a first pressure relief region 421 is formed in the region of the first insulating part 42 corresponding to the pressure relief mechanism 3, and the first pressure relief region 421 is configured to allow the discharge medium discharged by the pressure relief mechanism 3 to move from a side of the first insulating part 42 facing the pressure relief mechanism 3 to a side of the first insulating part 42 facing away from the pressure relief mechanism 3. The first pressure relief region 421 may include a first through hole 4211 provided on the first insulating part 42; the first pressure relief region 421 may also be a region defined by a first weak portion 4212 on the first insulating part 42, and the first weak portion 4212 may include a first linear groove 42121 and/or a first broken line 42122 provided on the first insulating part 42.

The second insulating member 5 includes a second insulating part 52 located between the first wall part 111 and the electrode assembly 2, and a second pressure relief region 521 is formed in the region of the second insulating part 52 corresponding to the pressure relief mechanism 3, and the second pressure relief region 521 is configured to allow the discharge medium inside the battery cell 10 to move from one side of the second insulating part 52 away from the pressure relief mechanism 3 to one side of the second insulating part 52 facing the pressure relief mechanism 3. The second pressure relief region 521 may include a second through hole provided on the second insulating part 52; the second pressure relief region 521 may also be a region defined by a second weak portion 5212 on the second insulating part 52, and the second weak portion 5212 may include a second linear groove 52121 and/or a second broken line 52122 provided on the second insulating part 52.

It should be noted that without conflict, the embodiments and the features of the embodiments in the present application may be combined with each other.

The above embodiments are only used to describe the technical solutions of the present application and are not intended to limit the present application. For those skilled in the art, the present application may have various modifications and variations. Any modifications, equivalent replacements, improvements, etc. made within the spirit and principles of the present application shall be included in the protection scope of the present application.

What is claimed is:

1. A battery cell, comprising:

an electrode assembly:

a casing having four sidewall parts and an opening covered by an end cover; and a first insulating member wrapping outer surfaces of the four sidewall parts of the casing along a circumferential direction of the opening,

US 12,614,791 B2

39

40 wherein
the four sidewall parts comprise a first wall part, a second wall part, a third wall part and a fourth wall part, the first wall part and the second wall part are facing each other and parallel to a thickness direction of the battery cell, and the third wall part and the fourth wall part are facing each other and are perpendicular to the thickness direction of the battery cell, the four sidewall parts are connected to form a rectangular space for accommodating the electrode assembly, and a pressure relief mechanism is provided on the first wall part;
wherein
a first pressure relief region is formed on the first insulating member, the first pressure relief region comprises a linear groove or a broken line that overlaps with the pressure relief mechanism provided on the first wall part, and the first pressure relief region is configured to be broken into an opening when a pressure inside the casing reaches a preset level, allowing a discharge medium discharged by the pressure relief mechanism to move from a side of the first insulating member facing the pressure relief mechanism to a side of the first insulating part facing away from the pressure relief mechanism; and
in the circumferential direction of the opening, two ends of the first insulating member are overlapping with each other to form a first overlapping region, and the first overlapping region is located next to the second side wall part; and
wherein the casing is formed by bending a plate to form the four sidewall parts, two ends of the plate are connected by welding to form a weld mark region on the second wall part, and the first overlapping region of the of the first insulating member covers at least a part of the weld mark region.

2. The battery cell according to claim 1, wherein
the electrode assembly comprises a positive electrode sheet and a negative electrode sheet; and the electrode assembly is in a laminated structure, and the positive electrode sheet and the negative electrode sheet are stacked in the thickness direction of the battery cell; or
the electrode assembly is in a wound structure, the electrode assembly has a straight region, and parts of the positive electrode sheet and the negative electrode sheet located in the straight region are stacked in the thickness direction of the battery cell.

3. The battery cell according to claim 1, further comprising:
a second insulating member provided on the inner surfaces of the sidewall parts of the casing, wherein the second insulating member is made of a solid insulating material;
wherein,
the second insulating member wraps outer surfaces of the electrode assembly along the circumferential direction of the opening, and in the circumferential direction of the opening, two ends of the second insulating member are overlapping with each other to form a second overlapping region, and the second overlapping region does not overlap with the pressure relief mechanism provided at the first side wall part of the casing;
a second pressure relief region is formed in a region of the second insulation member overlapping the pressure relief mechanism, and the second pressure relief region is configured to allow the discharge medium inside the battery cell to move from one side of the second insulating member facing the electrode assembly to one side of the second insulating member facing the pressure relief mechanism; and
the second pressure relief region has a second weak portion, the second weak portion is a second linear groove or a second broken line provided in the second insulating member.

* * * * *